United States Patent
Chiang et al.

(10) Patent No.: US 10,043,048 B2
(45) Date of Patent: Aug. 7, 2018

(54) CAPACITIVE FINGERPRINT SENSING APPARATUS AND CAPACITIVE FINGERPRINT SENSING METHOD

(71) Applicant: Raydium Semiconductor Corporation, Hsinchu (TW)

(72) Inventors: Chang-Ching Chiang, Taichung (TW); Yu Kuo Huang, Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 22 days.

(21) Appl. No.: 15/138,394

(22) Filed: Apr. 26, 2016

(65) Prior Publication Data

US 2016/0314333 A1    Oct. 27, 2016

Related U.S. Application Data

(60) Provisional application No. 62/153,311, filed on Apr. 27, 2015.

(51) Int. Cl.
    *G06K 9/00* (2006.01)
(52) U.S. Cl.
    CPC .................. *G06K 9/0002* (2013.01)
(58) Field of Classification Search
    CPC ............ G06K 9/0002; G06K 9/6857
    See application file for complete search history.

(56) References Cited

U.S. PATENT DOCUMENTS

| | | | | | |
|---|---|---|---|---|---|
| 4,353,056 | A * | 10/1982 | Tsikos | .................. | A61B 5/1172 361/283.1 |
| 6,011,859 | A * | 1/2000 | Kalnitsky | .......... | G06K 9/00053 382/100 |
| 6,392,636 | B1 * | 5/2002 | Ferrari | ................ | G06F 3/03547 345/157 |
| 6,525,547 | B2 * | 2/2003 | Hayes | .................. | G06K 9/0002 324/662 |
| 7,197,168 | B2 * | 3/2007 | Russo | ................ | G06K 9/00026 382/125 |
| 7,486,809 | B2 * | 2/2009 | Hara | ..................... | G06K 9/0002 324/658 |
| 7,663,380 | B2 * | 2/2010 | Chuang | ................ | G06K 9/0002 324/662 |
| 2001/0012384 | A1 * | 8/2001 | Kalnitsky | ............... | G06F 3/044 382/124 |
| 2004/0247163 | A1 * | 12/2004 | Hara | ........................ | G01D 5/24 382/124 |

(Continued)

*Primary Examiner* — Mia M Thomas

(57) ABSTRACT

The capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a synthesized fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

24 Claims, 38 Drawing Sheets

(56) References Cited

U.S. PATENT DOCUMENTS

| | | | | |
|---|---|---|---|---|
| 2004/0251917 A1* | 12/2004 | Blanchard | G01D 5/2405 | 324/661 |
| 2005/0031175 A1* | 2/2005 | Hara | G06K 9/0002 | 382/124 |
| 2005/0179446 A1* | 8/2005 | Hara | G06K 9/0002 | 324/662 |
| 2006/0067564 A1* | 3/2006 | Miyasaka | G06K 9/0002 | 382/124 |
| 2009/0206851 A1* | 8/2009 | Chuang | G06K 9/0002 | 324/686 |
| 2009/0208069 A1* | 8/2009 | Chuang | G06K 9/0002 | 382/124 |
| 2012/0105081 A1* | 5/2012 | Shaikh | G06K 9/0002 | 324/686 |
| 2013/0127752 A1* | 5/2013 | Takeuchi | G02F 1/13338 | 345/173 |
| 2013/0135247 A1* | 5/2013 | Na | G06F 21/32 | 345/174 |
| 2013/0342498 A1* | 12/2013 | Kim | G06F 3/044 | 345/174 |
| 2014/0085262 A1* | 3/2014 | Wen | G06F 3/0418 | 345/174 |
| 2014/0093145 A1* | 4/2014 | Feekes | G06K 9/00006 | 382/124 |
| 2014/0160043 A1* | 6/2014 | Hwang | G06F 3/0418 | 345/173 |
| 2014/0266262 A1* | 9/2014 | Taghibakhsh | G06K 9/0002 | 324/686 |
| 2014/0292396 A1* | 10/2014 | Bruwer | H03K 17/955 | 327/517 |
| 2015/0195007 A1* | 7/2015 | He | H04B 5/0012 | 455/41.1 |
| 2015/0242673 A1* | 8/2015 | Singhal | G06K 9/00013 | 345/174 |
| 2016/0180619 A1* | 6/2016 | Riedijk | G07C 9/00158 | 324/679 |
| 2017/0024598 A1* | 1/2017 | Chiang | G06K 9/38 | |
| 2017/0045992 A1* | 2/2017 | Lee | G06F 3/0416 | |
| 2017/0061194 A1* | 3/2017 | Chiang | G06K 9/00026 | |
| 2017/0075493 A1* | 3/2017 | Lee | G06F 3/0418 | |
| 2017/0103247 A1* | 4/2017 | Mizuhashi | H05K 1/0274 | |

\* cited by examiner

FP1

FP2

FP3

CAPACITIVE FINGERPRINT SENSING APPARATUS AND CAPACITIVE FINGERPRINT SENSING METHOD

BACKGROUND OF THE INVENTION

Field of the Invention

This invention relates to fingerprint sensing, especially to a capacitive fingerprint sensing apparatus and a capacitive fingerprint sensing method.

Description of the Related Art

With the developing of technology, the capacitive fingerprint sensing technology can be widely used in various kinds of electronic devices, especially portable electronic devices such as smart phones, notebook PCs and tablet PCs.

However, the fingerprint sensing technology has high resolution requirement; under the IAFIS standard, the fingerprint sensing chip should have at least resolution of 500 dpi and its unit sensing area should be 50 um*50 um. Under this condition, the capacity sensed by the unit sensing area will be small and easily interfered by the noises, so that fingerprint recognition will become harder. Therefore, the invention provides a capacitive fingerprint sensing apparatus and a capacitive fingerprint sensing method to solve the above-mentioned problems.

SUMMARY OF THE INVENTION

A preferred embodiment of the invention is a capacitive fingerprint sensing apparatus. In this embodiment, the capacitive fingerprint sensing apparatus includes a scanning driver, a sensing driver, a plurality of sensing electrodes, M sensing lines and N scanning lines. M and N are positive integers. The scanning driver is coupled to the N scanning lines. The sensing driver is coupled to the M sensing lines. The processing module is coupled to the plurality of sensing electrodes. The plurality of sensing electrodes is arranged to form a (N*M) matrix having N rows of sensing electrodes and M columns of sensing electrodes, wherein the M columns of sensing electrodes are arranged along a first direction and coupled to the M sensing lines respectively and the N rows of sensing electrodes are arranged along a second direction and coupled to the N scanning lines respectively.

In a self-capacitive sensing mode, the scanning driver scans the N rows of sensing electrodes through the N scanning lines respectively and the sensing driver performs self-capacitive sensing on the M columns of sensing electrodes through the M sensing lines respectively and the processing module obtains a first fingerprint pattern; in a mutual-capacitive sensing mode, the scanning driver scans N rows of sensing electrodes through N scanning lines respectively and the sensing driver performs mutual-capacitive sensing between odd columns of sensing electrodes and even columns of sensing electrodes of the N rows of sensing electrodes through odd sensing lines and even sensing lines of the M sensing lines respectively and the processing module obtains a second fingerprint pattern; the processing module combines the first fingerprint pattern and second fingerprint pattern into a synthesized fingerprint pattern. A resolution of the synthesized fingerprint pattern along at least one direction is larger than a resolution of the first fingerprint pattern and a resolution of the second fingerprint pattern along the at least one direction. The at least one direction includes at least one of the first direction, the second direction, . . . , and a L-th direction, and L≥3.

In an embodiment, a resolution of the first fingerprint pattern along the first direction is smaller than a resolution of the first fingerprint pattern along the second direction and a resolution of the second fingerprint pattern along the first direction is smaller than a resolution of the second fingerprint pattern along the second direction.

In an embodiment, a resolution of the first fingerprint pattern along the second direction is smaller than a resolution of the first fingerprint pattern along the first direction and a resolution of the second fingerprint pattern along the second direction is smaller than a resolution of the second fingerprint pattern along the first direction.

In an embodiment, a resolution of the first fingerprint pattern along the second direction is equal to a resolution of the first fingerprint pattern along the first direction and a resolution of the second fingerprint pattern along the second direction is equal to a resolution of the second fingerprint pattern along the first direction.

In an embodiment, a resolution of the synthesized fingerprint pattern along the first direction and a resolution of the synthesized fingerprint pattern along the second direction are both equal to a resolution of the first fingerprint pattern along the second direction and a resolution of the second fingerprint pattern along the second direction.

In an embodiment, a resolution of the synthesized fingerprint pattern along the first direction and a resolution of the synthesized fingerprint pattern along the second direction are different.

In an embodiment, the sensing driver selects the odd sensing lines of the M sensing lines as signal transmitters (TX) and selects the even sensing lines of the M sensing lines as signal receivers (RX) or the sensing driver selects the odd sensing lines of the M sensing lines as the signal receivers (RX) and selects the even sensing lines of the M sensing lines as the signal transmitters (TX).

In an embodiment, a J-th sensing line of the M sensing lines is coupled to every electrodes of a J-th column of sensing electrodes of the M columns of sensing electrodes respectively, J is a positive integer and 1≤J≤M, and a K-th scanning line of the N scanning lines is coupled to every electrodes of a K-th row of sensing electrodes of the N rows of sensing electrodes respectively, K is a positive integer and 1≤K≤N.

In an embodiment, the plurality of sensing electrodes has random geometric shapes.

Another preferred embodiment of the invention is also a capacitive fingerprint sensing apparatus. In this embodiment, the capacitive fingerprint sensing apparatus includes a scanning driver, a sensing driver, a plurality of sensing electrodes, (M+1) sensing lines and N pairs of scanning lines. Each pair of scanning lines includes a first scanning line and a second scanning line. M and N are positive integers. The scanning driver is coupled to the N pairs of scanning lines. The sensing driver is coupled to the (M+1) sensing lines. The processing module is coupled to the plurality of sensing electrodes. The plurality of sensing electrodes is arranged to form a (N*M) matrix having N rows of sensing electrodes and M columns of sensing electrodes, wherein the M columns of sensing electrodes are arranged along a first direction and coupled to the (M+1) sensing lines respectively in a Zig-Zag way and the N rows of sensing electrodes are arranged along a second direction and coupled to the N pairs of scanning lines respectively.

In a self-capacitive sensing mode, the scanning driver scans the N rows of sensing electrodes through the N pairs of scanning lines respectively and the sensing driver performs self-capacitive sensing on the M columns of sensing electrodes through the (M+1) sensing lines respectively and the processing module obtains a first fingerprint pattern; in a mutual-capacitive sensing mode, the scanning driver scans odd rows of sensing electrodes or even rows of sensing electrodes of the N rows of sensing electrodes through N first scanning lines and N second scanning lines of the N pairs of scanning lines respectively and the sensing driver performs mutual-capacitive sensing on the M columns of sensing electrodes or the N rows of sensing electrodes through the (M+1) sensing lines respectively and the processing module obtains a second fingerprint pattern; the processing module combines the first fingerprint pattern and second fingerprint pattern into a synthesized fingerprint pattern.

Another preferred embodiment of the invention is a capacitive fingerprint sensing method applied to a capacitive fingerprint sensing apparatus. The capacitive fingerprint sensing apparatus includes a scanning driver, a sensing driver, a plurality of sensing lines, a plurality of scanning lines and a plurality of sensing electrodes. The plurality of sensing electrodes is arranged in a regular way.

The capacitive fingerprint sensing method includes the following steps: in a self-capacitive sensing mode, the scanning driver scans the plurality of sensing electrodes through the plurality of scanning lines respectively and the sensing driver performs self-capacitive sensing on the plurality of sensing electrodes through the plurality of sensing lines respectively to obtain a first fingerprint pattern; in a mutual-capacitive sensing mode, the scanning driver scans the plurality of sensing electrodes through the plurality of scanning lines respectively and the sensing driver performs mutual-capacitive sensing on at least one pair of adjacent sensing electrodes of the plurality of sensing electrodes through the plurality of sensing lines respectively to obtain a second fingerprint pattern; and combining the first fingerprint pattern and second fingerprint pattern into a synthesized fingerprint pattern, wherein a resolution of the synthesized fingerprint pattern along at least one direction is larger than a resolution of the first fingerprint pattern and a resolution of the second fingerprint pattern along the at least one direction.

Compared to the prior art, the capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a synthesized fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A preferred embodiment of the invention is a capacitive fingerprint sensing apparatus. In this embodiment, the capacitive fingerprint sensing apparatus of the invention uses the self-capacitive sensing technology to perform a fingerprint sensing and uses the mutual-capacitive sensing technology to perform another fingerprint sensing respectively, and then the capacitive fingerprint sensing apparatus combines the self-capacitive fingerprint pattern and the mutual-capacitive fingerprint pattern into a synthesized fingerprint pattern.

It should be noticed that a resolution of the synthesized fingerprint pattern along at least one direction obtained by the capacitive fingerprint sensing apparatus of the invention is larger than resolutions of the first fingerprint pattern and the second fingerprint pattern along the at least one direction. Therefore, under the premise of maintaining its high resolution, the capacitive fingerprint sensing apparatus of the invention can effectively increase the capacity sensed by the unit sensing electrode to achieve the effects of reducing noise interference, increasing the accuracy of fingerprint recognition, reducing the number of signal traces, simplifying the circuit structure and saving the chip area.

Figure 1A:
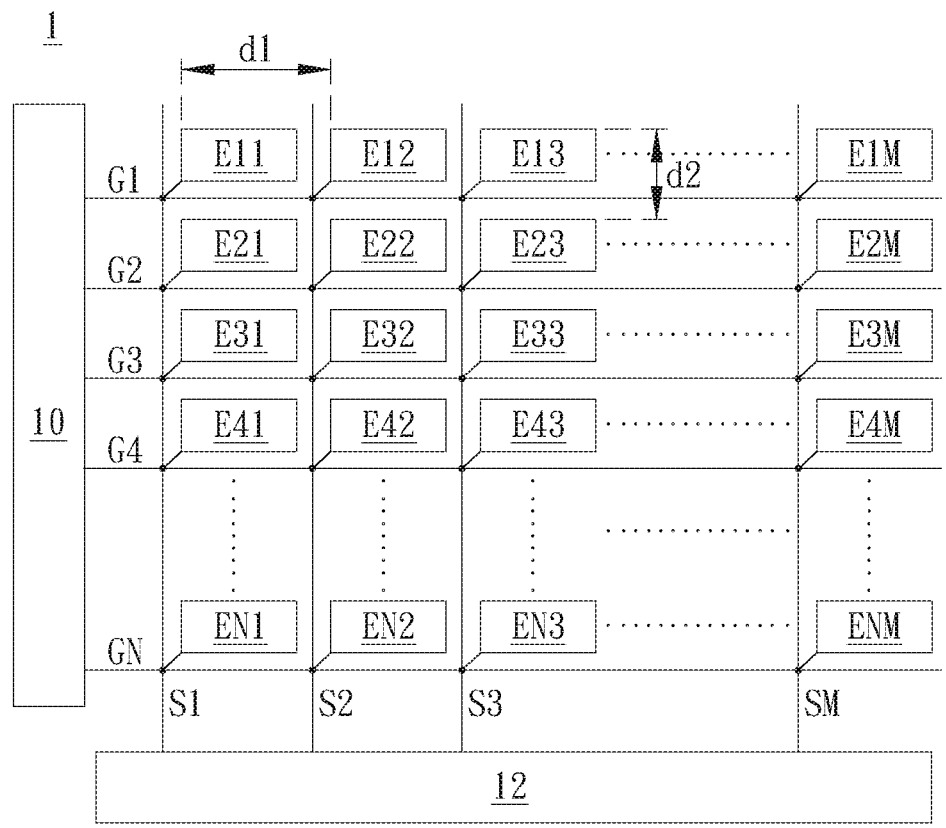
FIG. 1A and FIG. 1B illustrate schematic diagrams of different embodiments of the capacitive fingerprint sensing apparatus in the invention.
Figure 1B:
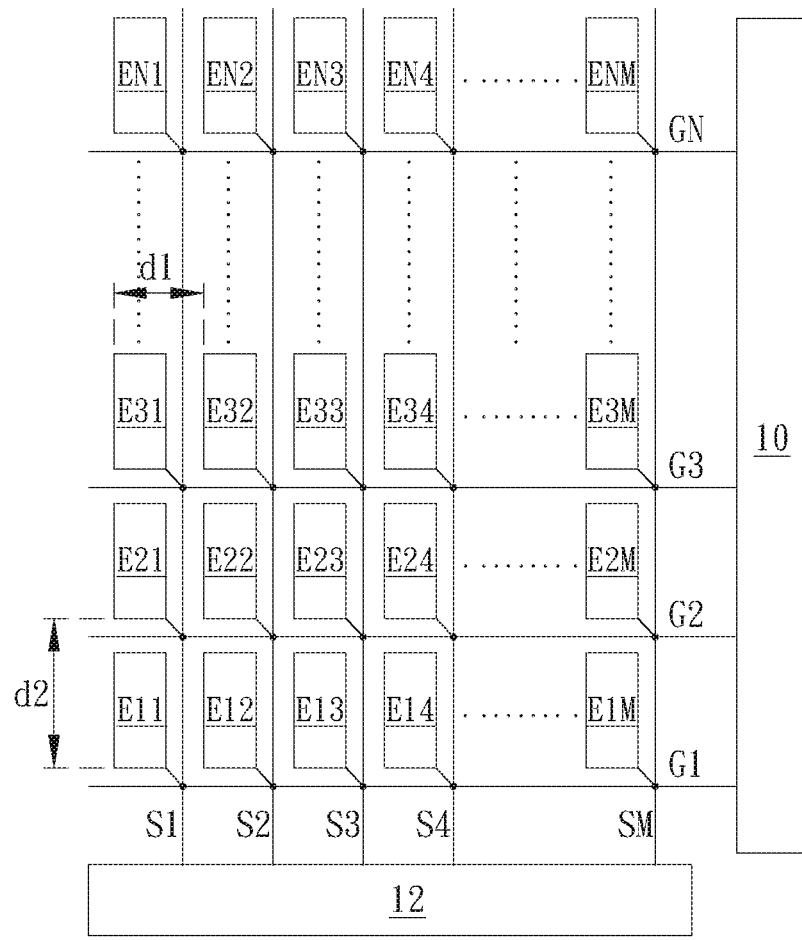

Please refer to FIG. 1A and FIG. 1B. FIG. 1A and FIG. 1B illustrate schematic diagrams of different embodiments of the capacitive fingerprint sensing apparatus in the invention. As shown in FIG. 1A, the capacitive fingerprint sensing apparatus 1 includes a scanning driver 10, a sensing driver 12, N scanning lines G1~GN, M sensing lines S1~SM and (N*M) sensing electrodes E11~ENM. M and N are positive integers. The scanning driver 10 is coupled to the N scanning lines G1~GN. The sensing driver 12 is coupled to the M sensing lines S1~SM.

It should be noted that the (N*M) sensing electrodes E11~ENM can be arranged in a regular way, such as a matrix arrangement or a triangle arrangement, but not limited to this. In this embodiment, the (N*M) sensing electrodes E11~ENM are arranged as a (N*M) matrix having N rows of sensing electrodes E11~E M, E21~E2M, E31~E3M, . . . , and EN1~ENM and M columns of sensing electrodes E11~EN1, E12~EN2, E13~EN3, . . . , and E1M~ENM. Wherein, the M columns of sensing electrodes E11~EN1, E12~EN2, E13~EN3, . . . , and E1M~ENM are arranged along a first direction (e.g., X-axis direction or horizontal direction) and coupled to the M sensing lines S1~SM respectively; the N rows of sensing electrodes E11~E1M, E21~E2M, E31~E3M, . . . , and EN1~ENM are arranged along a second direction (e.g., Y-axis direction or vertical direction) and coupled to the N scanning lines G1~GN respectively, but not limited to this.

In this embodiment, if a first length between the same sides of any two adjacent sensing electrodes (e.g., the left side of E11 and the left side of E12) in the same row of sensing electrodes of the capacitive fingerprint sensing apparatus 1 is d1 and a second length between the same sides of any two adjacent sensing electrodes (e.g., the upper side of E13 and the upper side of E23) in the same column of sensing electrodes of the capacitive fingerprint sensing apparatus 1 is d2, then the first length d1 is twice the second length d2 as shown in FIG. 1A, but not limited to this.

As to the capacitive fingerprint sensing apparatus 1' shown in FIG. 1B, the second length d2 between the same sides of any two adjacent sensing electrodes (e.g., the upper side of E13 and the upper side of E23) in the same column of sensing electrodes of the capacitive fingerprint sensing apparatus 1 is twice the first length d1 between the same sides of any two adjacent sensing electrodes (e.g., the left side of EN1 and the left side of EN2) in the same row of sensing electrodes of the capacitive fingerprint sensing apparatus 1, but not limited to this.

Then, the capacitive fingerprint sensing apparatus 1 including (4*5) sensing electrodes E11~E45 will be taken as an example.

Figure 2:
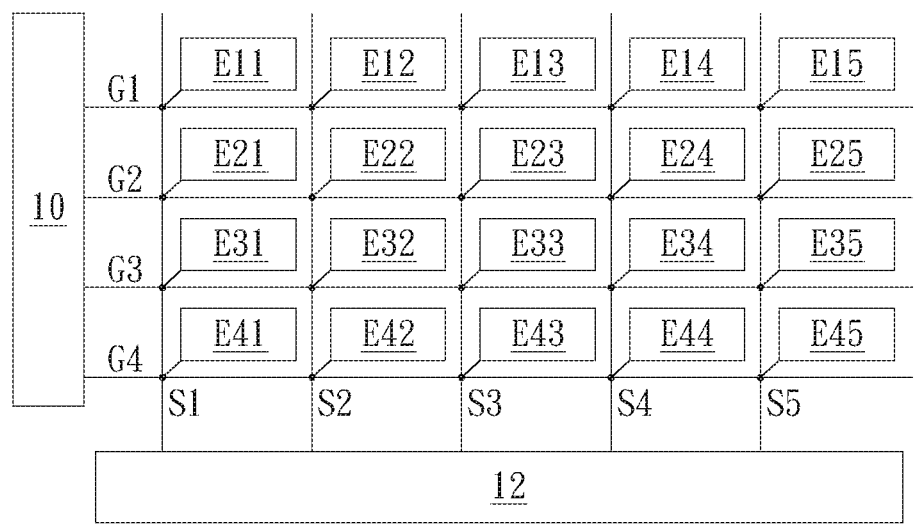
FIG. 2 illustrates a schematic diagram of the capacitive fingerprint sensing apparatus in a preferred embodiment of the invention.

Please refer to FIG. 2. FIG. 2 illustrates a schematic diagram of the capacitive fingerprint sensing apparatus 1 in FIG. 1A when N=4 and M=5. As shown in FIG. 2, the capacitive fingerprint sensing apparatus 1 includes a scanning driver 10, a sensing driver 12, four scanning lines G1~G4, five sensing lines S1~S5 and (4*5) sensing electrodes E11~E45. Wherein, the (4*5) sensing electrodes E11~E45 are arranged as a (5*4) matrix having five columns of sensing electrodes and four rows of sensing electrodes, but not limited to this.

The scanning line G1 extending from the scanning driver 10 is coupled to the first column of sensing electrodes E11~E15 in order; similarly, the scanning line G2 is coupled to the second column of sensing electrodes E21~E25 in order; the scanning line G3 is coupled to the third column of sensing electrodes E31~E35 in order; the scanning line G4 is coupled to the fourth column of sensing electrodes E41~E45 in order.

The sensing line S1 extending from the sensing driver 12 is coupled to the first row of sensing electrodes E11~E41 in order; similarly, the sensing line S2 is coupled to the second row of sensing electrodes E12~E42 in order; the sensing line S3 is coupled to the third row of sensing electrodes E13~E43 in order; the sensing line S4 is coupled to the four row of sensing electrodes E14~E44 in order; the sensing line S5 is coupled to the fifth row of sensing electrodes E15~E45 in order.

From above, it can be found that the sensing electrode E11 is coupled to the node of the scanning line G1 and the sensing line S1; the sensing electrode E12 is coupled to the node of the scanning line G1 and the sensing line S2; sensing electrode E21 is coupled to the node of the scanning line G2 and the sensing line S1; and so on.

Figure 3:
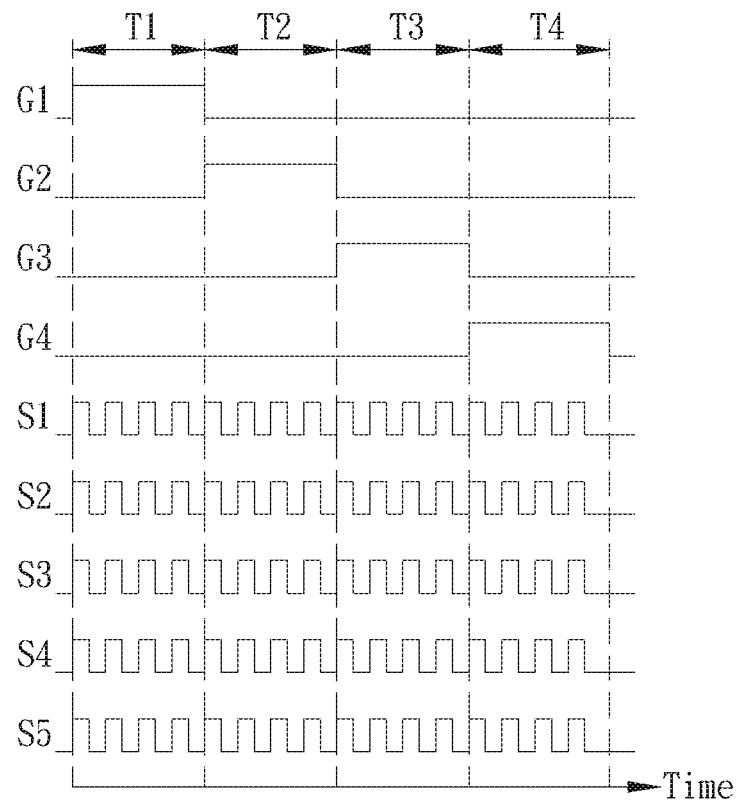
FIG. 3 illustrates a timing diagram of the capacitive fingerprint sensing apparatus in FIG. 2 scanning the four rows of sensing electrodes E11~E15, E21~E25, E31~E35 and E41~E45 through the scanning lines G1~G4 respectively during the times T1~T4 and performing self-capacitive sensing on the five columns of sensing electrodes E11~E41, E12~E42, E13~E43, E14~E44 and E15~E45 through the sensing lines S1~S5 respectively in the self-capacitive sensing mode.

Then, please refer to FIG. 2 and FIG. 3. FIG. 3 illustrates a timing diagram of the capacitive fingerprint sensing apparatus in FIG. 2 scanning the four rows of sensing electrodes E11~E15, E21~E25, E31~E35 and E41~E45 through the scanning lines G1~G4 respectively during the times T1~T4 and performing self-capacitive sensing on the five columns of sensing electrodes E11~E41, E12~E42, E13~E43, E14~E44 and E15~E45 through the sensing lines S1~S5 respectively in the self-capacitive sensing mode.

As shown in FIG. 3, under the self-capacitive sensing mode, during the period of the time T1, the scanning signal of the scanning line G1 is at high-level and the scanning signals of the other scanning lines G2~G4 are at low-level. It represents that the scanning driver 10 of the capacitive fingerprint sensing apparatus 1 scans the first row of sensing electrodes E11~E15 through the scanning line G1 during the period of the time T1.

Similarly, during the period of the time T2, the scanning signal of the scanning line G2 is at high-level and the scanning signals of the other scanning lines G1, G3~G4 are at low-level. It represents that the scanning driver 10 of the capacitive fingerprint sensing apparatus 1 scans the second row of sensing electrodes E21~E25 through the scanning line G2 during the period of the time T2. During the period of the time T3, the scanning signal of the scanning line G3 is at high-level and the scanning signals of the other scanning lines G1~G2, G4 are at low-level. It represents that the scanning driver 10 of the capacitive fingerprint sensing apparatus 1 scans the third row of sensing electrodes E31~E35 through the scanning line G3 during the period of the time T3. During the period of the time T4, the scanning signal of the scanning line G4 is at high-level and the scanning signals of the other scanning lines G1~G3 are at low-level. It represents that the scanning driver 10 of the capacitive fingerprint sensing apparatus 1 scans the fourth row of sensing electrodes E41~E45 through the scanning line G4 during the period of the time T4.

Therefore, after the period of the times T1~T4, the scanning driver 10 of the capacitive fingerprint sensing apparatus 1 finishes the scanning of the four rows of sensing electrodes E11~E15, E21~E25, E31~E35 and E41~E45 in order through the scanning lines G1~G4 respectively.

Figure 6A:
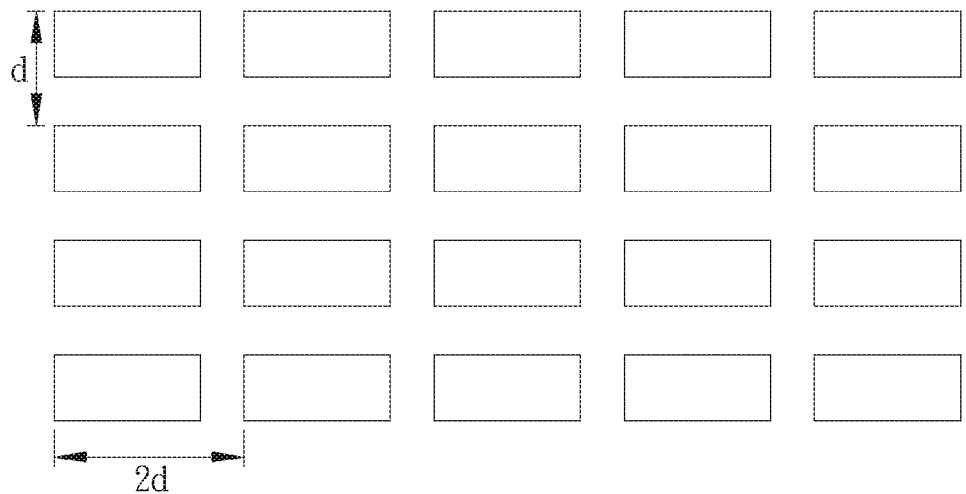
FIG. 6A, FIG. 6B and FIG. 6C illustrate schematic diagrams of the first fingerprint pattern obtained by the capacitive fingerprint sensing apparatus in the self-capacitive sensing mode, the second fingerprint pattern obtained by the capacitive fingerprint sensing apparatus in the mutual-capacitive sensing mode and the synthesized fingerprint pattern obtained by combining the first fingerprint pattern with the second fingerprint pattern.

In addition, as shown in FIG. 3, during the period of the times T1~T4, there will be sensing signals on the sensing lines S1~S5. It represents that the sensing driver 12 of the capacitive fingerprint sensing apparatus 1 performs self-capacitive sensing on the five columns of sensing electrodes E11~E41, E12~E42, E13~E43, E14~E44 and E15~E45 through the sensing lines S1~S5 respectively during the period of the times T1~T4 to obtain a first fingerprint pattern FP1 (as shown in FIG. 6A).

Figure 4:
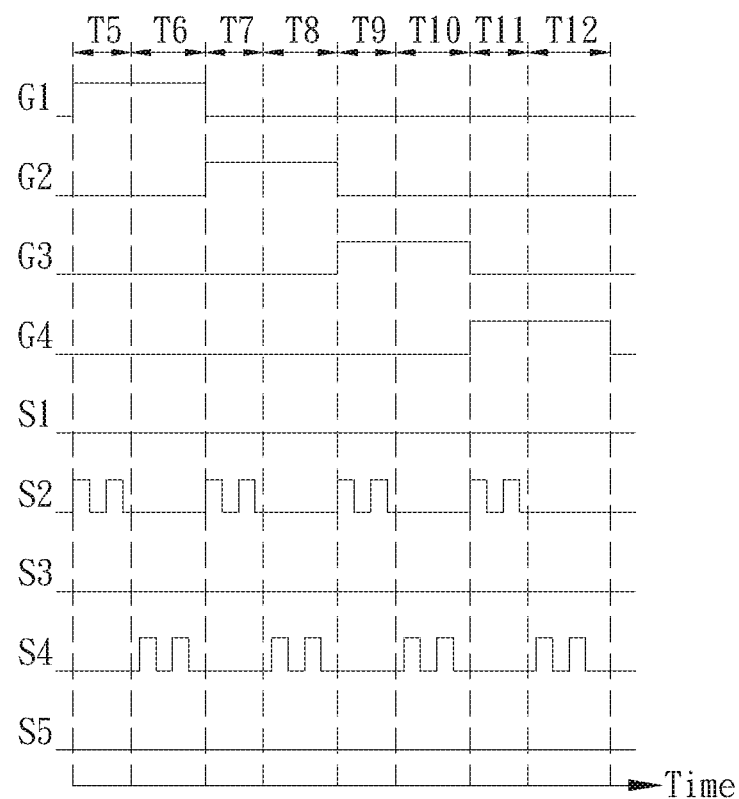
FIG. 4 illustrates a timing diagram of the capacitive fingerprint sensing apparatus in FIG. 2 scanning the four rows of sensing electrodes E11~E15, E21~E25, E31~E35 and E41~E45 through the scanning lines G1~G4 respectively and performing mutual-capacitive sensing on the odd columns of sensing electrodes E11~E41, E13~E43 and E15~E45 and the even columns of sensing electrodes E12~E42 and E14~E44 of the five columns of sensing electrodes E11~E41, E12~E42, E13~E43, E14~E44 and E15~E45 through the odd sensing lines S1, S3 and S5 and the even sensing lines S2 and S4 respectively in the mutual-capacitive sensing mode.

Then, please refer to FIG. 2 and FIG. 4. FIG. 4 illustrates a timing diagram of the capacitive fingerprint sensing apparatus in FIG. 2 scanning the four rows of sensing electrodes E11~E15, E21~E25, E31~E35 and E41~E45 through the scanning lines G1~G4 respectively and performing mutual-capacitive sensing on the odd columns of sensing electrodes E11~E41, E13~E43 and E15~E45 and the even columns of sensing electrodes E12~E42 and E14~E44 of the five columns of sensing electrodes E11~E41, E12~E42, E13~E43, E14~E44 and E15~E45 through the odd sensing lines S1, S3 and S5 and the even sensing lines S2 and S4 respectively in the mutual-capacitive sensing mode. As shown in FIG. 4, under the mutual-capacitive sensing mode, during the period of the times T5 and T6, the scanning signal of the scanning line G1 is at high-level and the scanning signals of the other scanning lines G2~G4 are at low-level. It represents that the scanning driver 10 of the capacitive fingerprint sensing apparatus 1 scans the first row of sensing electrodes E11~E15 through the scanning line G1 during the period of the times T5 and T6.

Figure 5A:
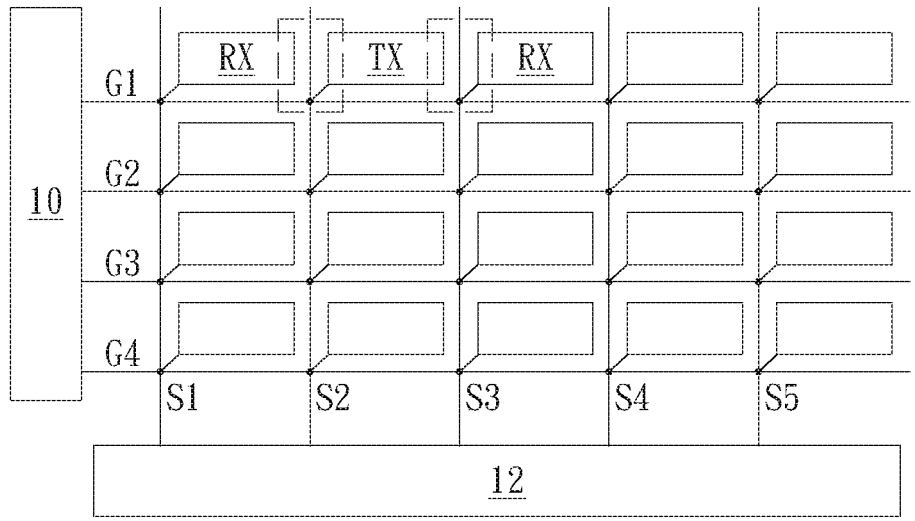
FIG. 5A and FIG. 5B illustrate schematic diagrams of the capacitive fingerprint sensing apparatus scanning the first row of sensing electrodes E11~E15 through the scanning line G1 and performing mutual-capacitive sensing respectively during the times T5 and T6 in FIG. 4.

Please refer to FIG. 2, FIG. 4 and FIG. 5A. During the period of the time T5, the sensing electrodes E11 and E13 are used as the receiver electrodes RX and the sensing electrode E12 is used as the transmitter electrode TX for mutual-capacitive sensing. At this time, there will be the mutual-capacitive sensing signal on the sensing line S2 only, and no mutual-capacitive sensing signals on the other sensing lines S1, S3~S5.

Figure 5B:
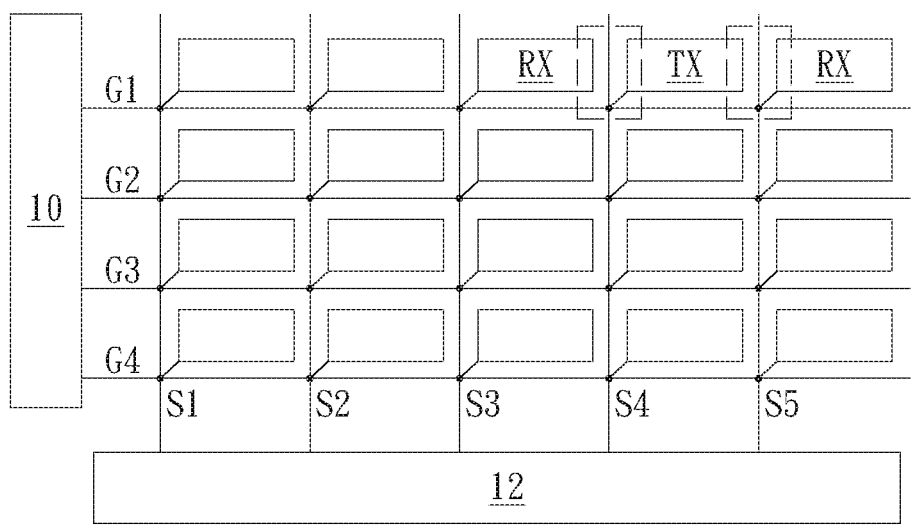

Similarly, please refer to FIG. 2, FIG. 4 and FIG. 5B. During the period of the time T6, the sensing electrodes E13 and E15 are used as the receiver electrodes RX and the sensing electrode E14 is used as the transmitter electrode TX for mutual-capacitive sensing. At this time, there will be the mutual-capacitive sensing signal on the sensing line S4 only, and no mutual-capacitive sensing signals on the other sensing lines S1~S3, S5.

Similarly, as shown in FIG. 4, under the mutual-capacitive sensing mode, during the period of the times T7 and T8, the scanning signal of the scanning line G2 is at high-level and the scanning signals of the other scanning lines G1, G3~G4 are at low-level. It represents that the scanning driver 10 of the capacitive fingerprint sensing apparatus 1 scans the second row of sensing electrodes E21~E25 through the scanning line G2 during the period of the times T7 and T8.

According to FIG. 5A and FIG. 5B, it can be also known that the sensing electrodes E21 and E23 are used as the receiver electrodes RX and the sensing electrode E22 is used as the transmitter electrode TX for mutual-capacitive sensing during the period of the time T7. At this time, there will be the mutual-capacitive sensing signal on the sensing line S2 only, and no mutual-capacitive sensing signals on the other sensing lines S1, S3~S5. During the period of the time T8, the sensing electrodes E23 and E25 are used as the receiver electrodes RX and the sensing electrode E24 is used as the transmitter electrode TX for mutual-capacitive sensing. At this time, there will be the mutual-capacitive sensing signal on the sensing line S4 only, and no mutual-capacitive sensing signals on the other sensing lines S1~S3, S5. Conditions during the period of the times T9 and T10 and the period of the times T11 and T12 can be obtained similarly, so that they are not repeat here.

Figure 6B:
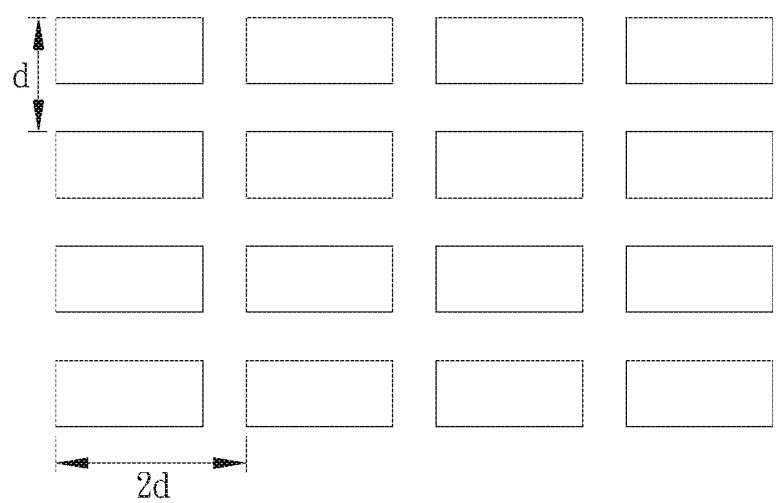

After the capacitive fingerprint sensing apparatus 1 finishes the above-mentioned mutual-capacitive sensing under the mutual-capacitive sensing mode, the capacitive fingerprint sensing apparatus 1 can obtain a second fingerprint pattern FP2 as shown in FIG. 6B. In fact, the order of the self-capacitive scanning and the mutual-capacitive scanning in the invention has no limitations; for example, the mutual-capacitive scanning can be performed first and then the self-capacitive scanning is performed; the mutual-capacitive scanning and the self-capacitive scanning can be also performed alternately, or any other orders. In other words, if the entire scanning of the times T11~T12 can be finished, the timing and waveform at the times T11~T12 can be randomly arranged without any specific limitations. Then, the capacitive fingerprint sensing apparatus 1 will combine the self-capacitive sensed first fingerprint pattern FP1 of FIG. 6A and the mutual-capacitive sensed second fingerprint pattern FP2 of FIG. 6B into a synthesized fingerprint pattern FP3 of FIG. 6C.

Figure 6C:
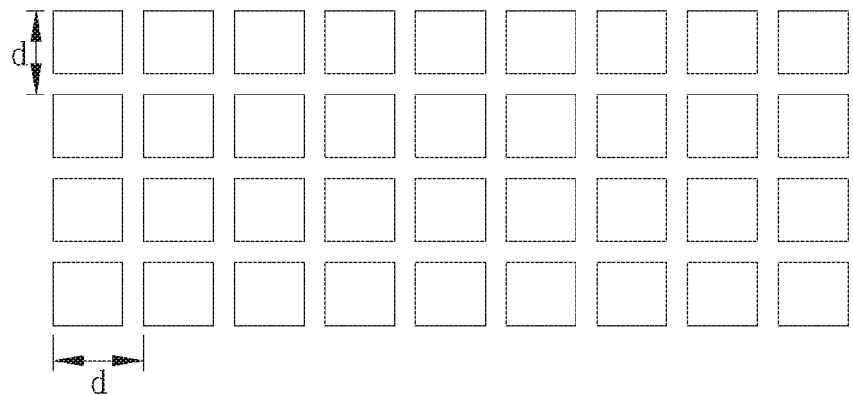

After comparing FIG. 6A, FIG. 6B and FIG. 6C, it can be found that the length 2$d$ between the same side of any two adjacent sensed patterns in the same row sensed patterns of the self-capacitive sensed first fingerprint pattern FP1 of FIG. 6A and the mutual-capacitive sensed second fingerprint pattern FP2 of FIG. 6B is twice of the length d between the same side of any two adjacent sensed patterns in the same column sensed patterns of the self-capacitive sensed first fingerprint pattern FP1 of FIG. 6A and the mutual-capacitive sensed second fingerprint pattern FP2 of FIG. 6B, but the length d between the same side of any two adjacent sensed patterns in the same row sensed patterns of the synthesized fingerprint pattern FP3 of FIG. 6C is the same with the length d between the same side of any two adjacent sensed patterns in the same column sensed patterns of the synthesized fingerprint pattern FP3 of FIG. 6C.

In other words, the vertical direction (Y-direction) resolution of the self-capacitive sensed first fingerprint pattern FP1 of FIG. 6A and the mutual-capacitive sensed second fingerprint pattern FP2 of FIG. 6B is twice of the horizontal direction (X-direction) resolution of the self-capacitive sensed first fingerprint pattern FP1 of FIG. 6A and the mutual-capacitive sensed second fingerprint pattern FP2 of FIG. 6B; the vertical direction (Y-direction) resolution and the horizontal direction (X-direction) resolution of the synthesized fingerprint pattern FP3 of FIG. 6C are the same.

As to the vertical direction (Y-direction), the length d between the same side of any two adjacent sensed patterns in the same column sensed patterns of the synthesized fingerprint pattern FP3 of FIG. 6C is equal to the length d between the same side of any two adjacent sensed patterns in the same column sensed patterns of the self-capacitive sensed first fingerprint pattern FP1 of FIG. 6A and the mutual-capacitive sensed second fingerprint pattern FP2 of FIG. 6B. In other words, the vertical direction (Y-direction) resolution of the synthesized fingerprint pattern FP3 of FIG. 6C is equal to the vertical direction (Y-direction) resolution of the self-capacitive sensed first fingerprint pattern FP1 of FIG. 6A and the mutual-capacitive sensed second fingerprint pattern FP2 of FIG. 6B.

As to the horizontal direction (X-direction), the length d between the same side of any two adjacent sensed patterns in the same row sensed patterns of the synthesized fingerprint pattern FP3 of FIG. 6C is half of the length 2$d$ between the same side of any two adjacent sensed patterns in the same row sensed patterns of the self-capacitive sensed first fingerprint pattern FP1 of FIG. 6A and the mutual-capacitive sensed second fingerprint pattern FP2 of FIG. 6B. In other words, the horizontal direction (X-direction) resolution of the synthesized fingerprint pattern FP3 of FIG. 6C is twice of the horizontal direction (X-direction) resolution of the self-capacitive sensed first fingerprint pattern FP1 of FIG. 6A and the mutual-capacitive sensed second fingerprint pattern FP2 of FIG. 6B.

Figure 7:
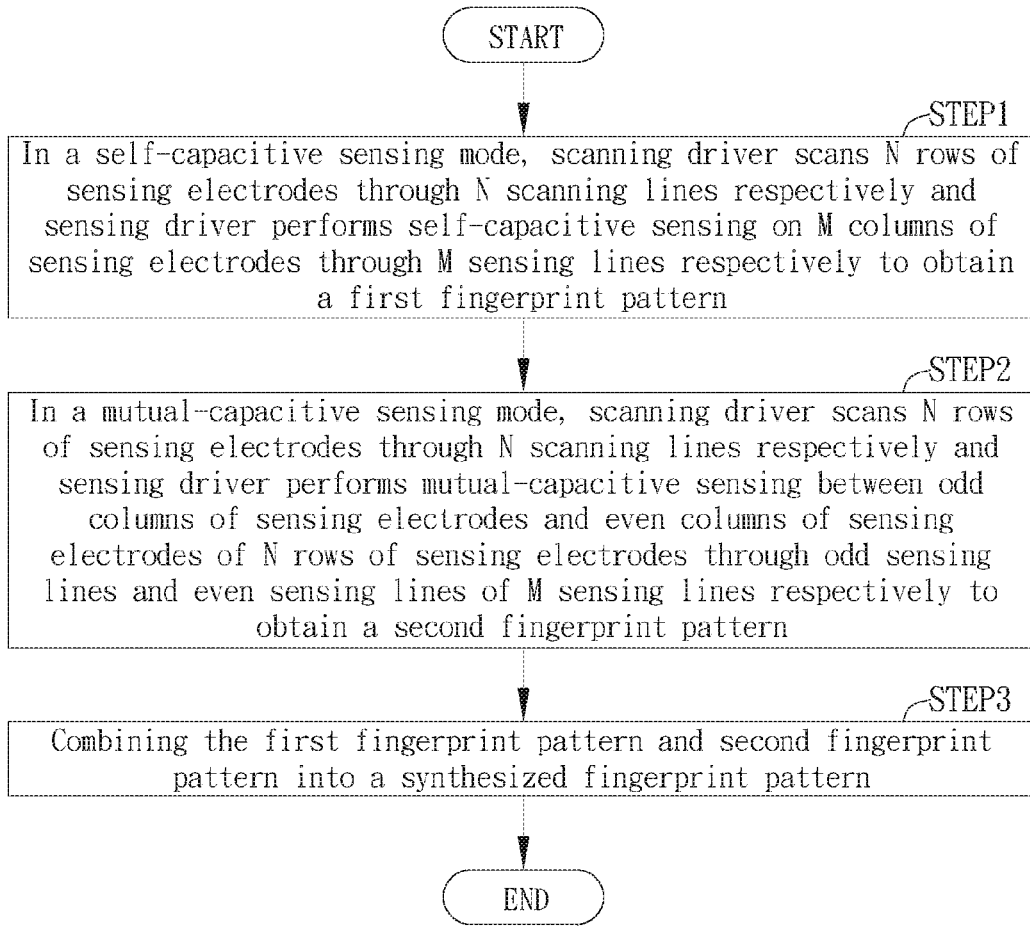
FIG. 7 illustrates a flowchart of the capacitive fingerprint sensing method in another preferred embodiment of the invention.

Then, please refer to FIG. 7. FIG. 7 illustrates a flowchart of the capacitive fingerprint sensing method in another preferred embodiment of the invention. In this embodiment, the capacitive fingerprint sensing method is realized by operating a capacitive fingerprint sensing apparatus. The capacitive fingerprint sensing apparatus includes a scanning driver, a sensing driver, N scanning lines, M sensing lines and (N*M) sensing electrodes. M and N are positive integers.

It should be noticed that the (N*M) sensing electrodes can be arranged in a regular way, for example, the regular way that the (N*M) sensing electrodes are arranged can be a matrix arrangement or a triangle arrangement, but not limited to this. In this embodiment, the (N*M) sensing electrodes can be arranged in a (N*M) matrix having N rows of sensing electrodes and M columns of sensing electrodes, wherein the M columns of sensing electrodes are arranged along the first direction (X-direction or horizontal direction) and coupled to the M sensing lines respectively; the N rows of sensing electrodes are arranged along the second direction (Y-direction or vertical direction) and coupled to the N scanning lines respectively, but not limited to this.

As shown in FIG. 7, in STEP1, in a self-capacitive sensing mode, the scanning driver scans the N rows of sensing electrodes through the N scanning lines respectively and the sensing driver performs self-capacitive sensing on the M columns of sensing electrodes through the M sensing lines respectively to obtain a first fingerprint pattern; in STEP2, in a mutual-capacitive sensing mode, the scanning driver scans the N rows of sensing electrodes through the N scanning lines respectively and the sensing driver performs mutual-capacitive sensing on odd columns of sensing electrodes and even columns of sensing electrodes of the M columns of sensing electrodes through odd sensing lines and even sensing lines of the M sensing lines respectively to obtain a second fingerprint pattern. In STEP3, the method combines the first fingerprint pattern and second fingerprint pattern into a synthesized fingerprint pattern, wherein a resolution of the synthesized fingerprint pattern along at least one direction is larger than a resolution of the first fingerprint pattern and a resolution of the second fingerprint pattern along the at least one direction. That is to say, the resolution of the synthesized fingerprint pattern will be larger than the resolution of the first fingerprint pattern and the resolution of the second fingerprint pattern along one direction or more directions.

Figure 8A:
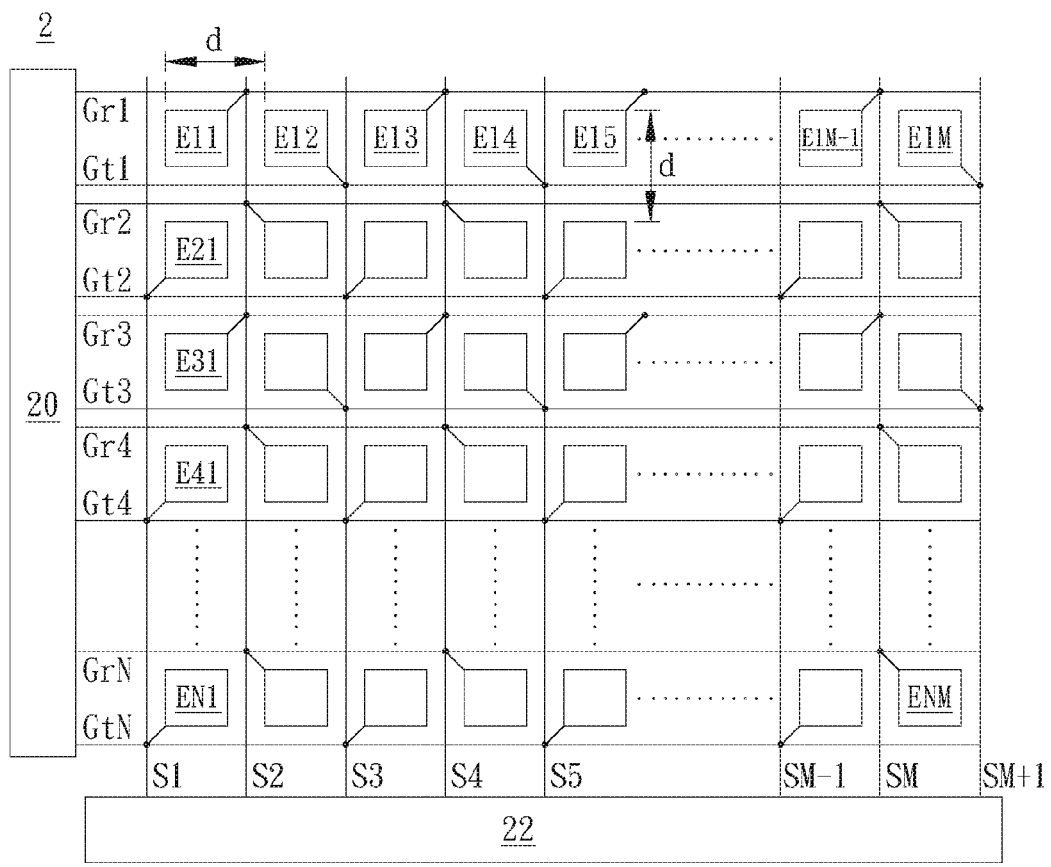
FIG. 8A illustrates a schematic diagram of the capacitive fingerprint sensing apparatus in another preferred embodiment of the invention.

Then, please refer to FIG. 8A. FIG. 8A illustrates a schematic diagram of the capacitive fingerprint sensing apparatus in another preferred embodiment of the invention. As shown in FIG. 8A, the capacitive fingerprint sensing apparatus 2 includes a scanning driver 20, a sensing driver 22, (N*M) sensing electrodes E11~ENM, (M+1) sensing lines S1~SM+1 and N pairs of scanning lines Gr1 & Gt1, Gr2 & Gt2, . . . , and GrN & GtN. In this embodiment, the (N*M) sensing electrodes E11~ENM are arranged as a (N*M) matrix having N rows of sensing electrodes and M columns of sensing electrodes, but not limited to this.

After comparing this embodiment with the above-mentioned embodiments, it can be found that the largest difference between this embodiment and the above-mentioned embodiments is that each row of sensing electrodes (e.g., the first row of sensing electrodes E11~E1M) corresponds to one pair of scanning lines (e.g., the first pair of scanning lines Gr1 & Gt1) in this embodiment instead of corresponding to one scanning line (e.g., the first scanning line Gr1) as the above-mentioned embodiments.

Taking the first pair of scanning lines Gr1 & Gt1 for example, the first pair of scanning lines Gr1 & Gt1 includes the first scanning line Gr1 and the second scanning line Gt1 both coupled to the scanning driver 20. Wherein, the first scanning line Gr1 is coupled to the odd sensing electrodes E11, E13, . . . of the first row of sensing electrodes E11~E1M respectively and the second scanning line Gt1 is coupled to the even sensing electrodes E12, E14, . . . of the first row of sensing electrodes E11~E1M respectively. The (M+1) sensing lines S1~SM+1 are all coupled to the sensing driver 22; the M rows of sensing electrodes E11~EN1, E12~EN2, . . . , E1M~ENM are coupled to the (M+1) sensing lines S1~SM+1 in a Zig-Zag way.

Taking the first row of sensing electrodes E11~EN1 for example, two adjacent sensing electrodes E11 and E21 of the first row of sensing electrodes E11~EN1 are coupled to the first sensing line S1 and the second sensing line S2 of the (M+1) sensing lines S1~SM+1 respectively, and so on.

In the capacitive fingerprint sensing apparatus 2, the length between the same side of any two adjacent sensing electrodes (e.g., the left side of the sensing electrode E11 and the left side of the sensing electrode E12) of the same row of sensing electrodes and the length between the same side of any two adjacent sensing electrodes (e.g., the upper side of the sensing electrode E11 and the upper side of the sensing electrode E12) of the same column of sensing electrodes are both d, but not limited to this.

Figure 8B:
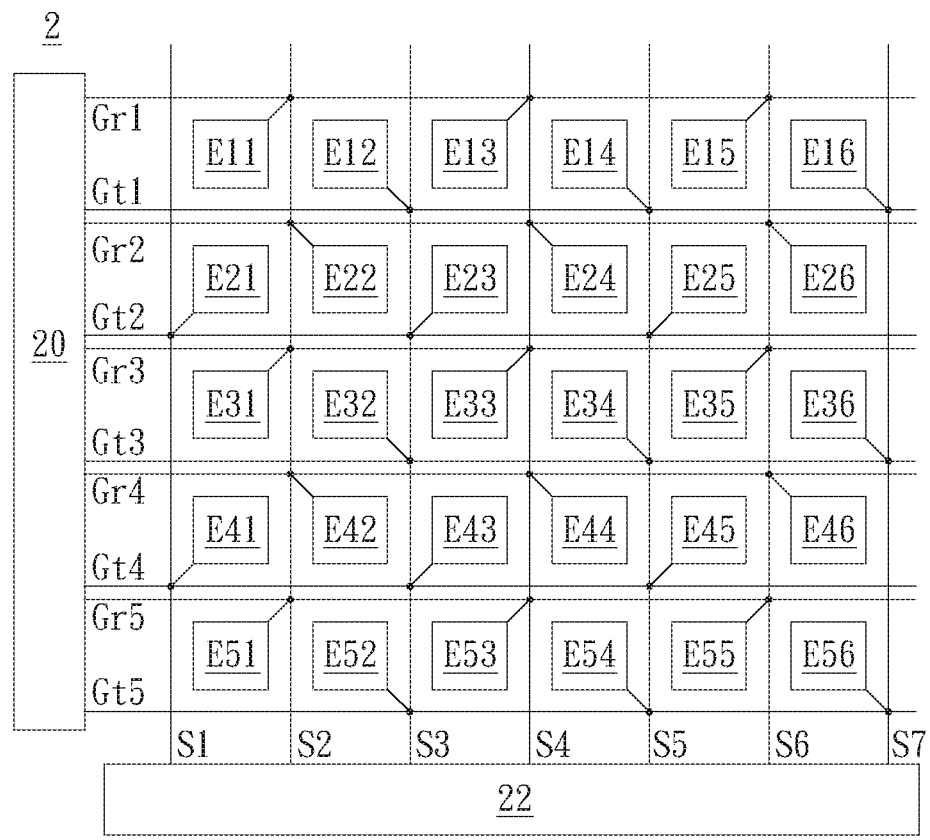
FIG. 8B illustrates a schematic diagram of the capacitive fingerprint sensing apparatus in FIG. 8A when M=6 and N=5.

Then, please refer to FIG. 8B. FIG. 8B illustrates a schematic diagram of the capacitive fingerprint sensing apparatus 2 in FIG. 8A when M=6 and N=5. As shown in FIG. 8B, the capacitive fingerprint sensing apparatus 2 includes the scanning driver 20, the sensing driver 22, the (5*6) sensing electrodes E11~E56, the five pairs of scanning lines Gr1 & Gt1~Gr5 & Gt5 and the seven sensing lines S1~S7. Taking the first row of sensing electrodes E11~E16 for example, the sensing electrode E11 is coupled to the node that the scanning line Gr1 and the sensing line S2 are connected; the sensing electrode E12 is coupled to the node that the scanning line Gt1 and the sensing line S3 are connected; the sensing electrode E13 is coupled to the node that the scanning line Gr1 and the sensing line S4 are connected; the sensing electrode E14 is coupled to the node that the scanning line Gt1 and the sensing line S5 are connected, and so on.

Figure 9:
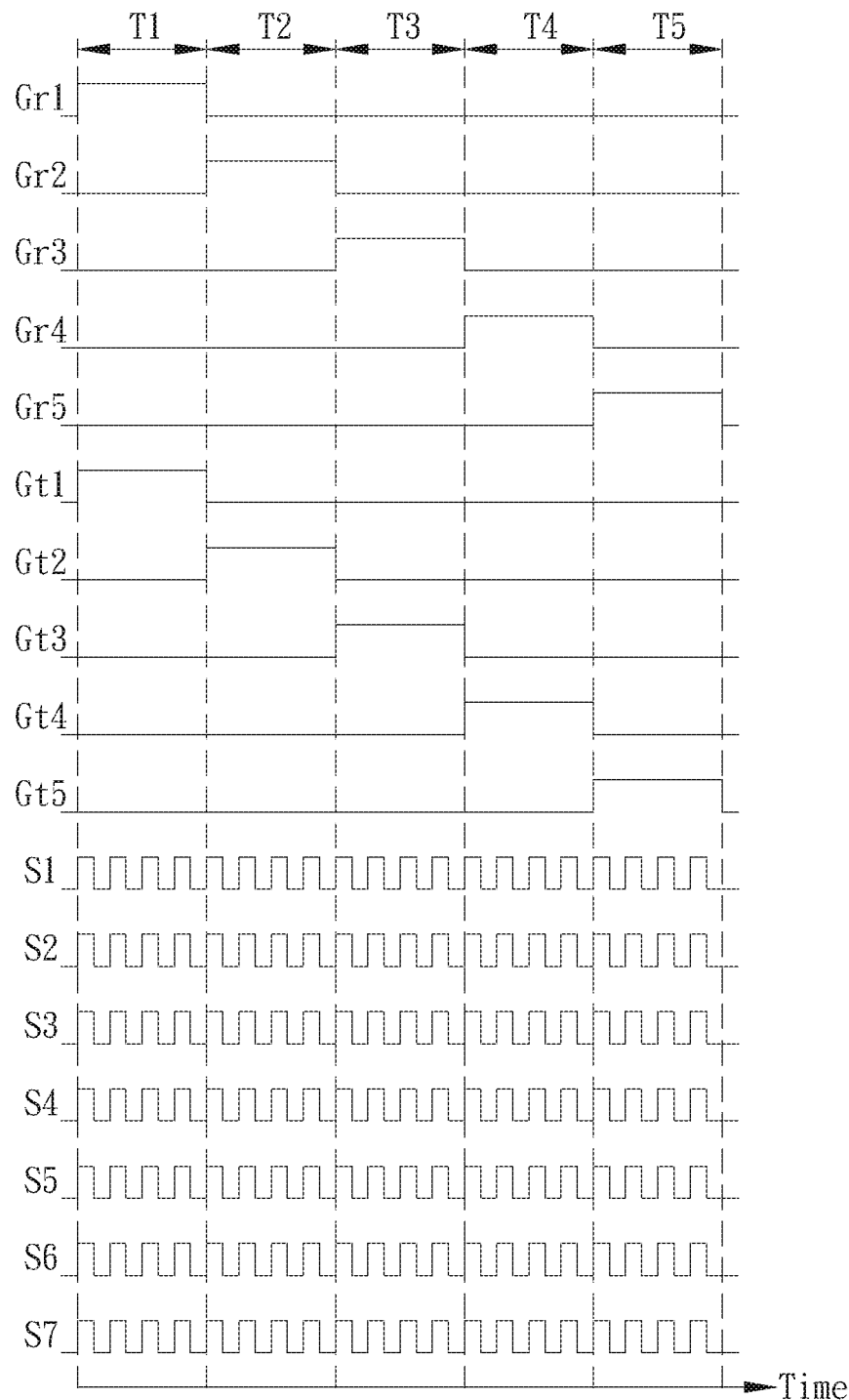
FIG. 9 illustrates a timing diagram of the capacitive fingerprint sensing apparatus in FIG. 8B scanning the five rows of sensing electrodes E11~E16, E21~E26, E31~E36, E41~E46 and E51~E56 through the five pairs of scanning lines Gr1&Gt1, Gr2&Gt2, Gr3&Gt3, Gr4&Gt4 and Gr5&Gt5 respectively during the times T1~T5 and performing self-capacitive sensing on the six columns of sensing electrodes E11~E51, E12~E52, E13~E53, E14~E54, E15~E55 and E16~E56 through the seven sensing lines S1~S7 respectively in the self-capacitive sensing mode.

Then, please refer to FIG. 8B and FIG. 9. FIG. 9 illustrates a timing diagram of the capacitive fingerprint sensing apparatus 2 in FIG. 8B scanning the five rows of sensing electrodes E11~E16, E21~E26, E31~E36, E41~E46 and E51~E56 through the five pairs of scanning lines Gr1&Gt1, Gr2&Gt2, Gr3&Gt3, Gr4&Gt4 and Gr5&Gt5 respectively during the times T1~T5 and performing self-capacitive sensing on the six columns of sensing electrodes E11~E51, E12~E52, E13~E53, E14~E54, E15~E55 and E16~E56 through the seven sensing lines S1~S7 respectively in the self-capacitive sensing mode.

As shown in FIG. 9, in the self-capacitive sensing mode, during the period of the time T1, the scanning signals of the first pair of scanning lines Gr1 & Gt1 are both at high-level and the scanning signals of the other pairs of scanning lines Gr2 & Gt2 Gr5 & Gt5 are all at low-level. This represents that during the period of the time T1, the scanning driver 20 of the capacitive fingerprint sensing apparatus 2 scans the first row of sensing electrodes E11~E16 through the first pair of scanning lines Gr1 & Gt1. Wherein, the first scanning line Gr1 of the first pair of scanning lines Gr1 & Gt1 scans the odd sensing electrodes E11, E13 and E15 of the first row of sensing electrodes E11~E16 and the second scanning line Gt1 of the first pair of scanning lines Gr1 & Gt1 scans the even sensing electrodes E12 and E14 of the first row of sensing electrodes E11~E16.

Similarly, during the period of the time T2, the scanning signals of the second pair of scanning lines Gr2 & Gt2 are both at high-level and the scanning signals of the other pairs of scanning lines Gr1 & Gt1, Gr3 & Gt3 Gr5 & Gt5 are all at low-level. This represents that during the period of the time T2, the scanning driver 20 of the capacitive fingerprint sensing apparatus 2 scans the second row of sensing electrodes E21~E26 through the second pair of scanning lines Gr2 & Gt2. Wherein, the scanning line Gr2 of the second pair of scanning lines Gr2 & Gt2 scans the odd sensing electrodes E21, E23 and E25 of the second row of sensing electrodes E21~E26 and the scanning line Gt2 of the second pair of scanning lines Gr2 & Gt2 scans the even sensing electrodes E22 and E24 of the second row of sensing electrodes E21~E26, and so on. Therefore, after the periods of the times T1~T5, the scanning driver 20 of the capacitive fingerprint sensing apparatus 2 scans the five rows of sensing electrodes E11~E16, E21~E26, E31~E36 and E41~E46 through the five pairs of scanning lines Gr1 & Gt1 Gr5 & Gt5 in order.

Figure 12A:
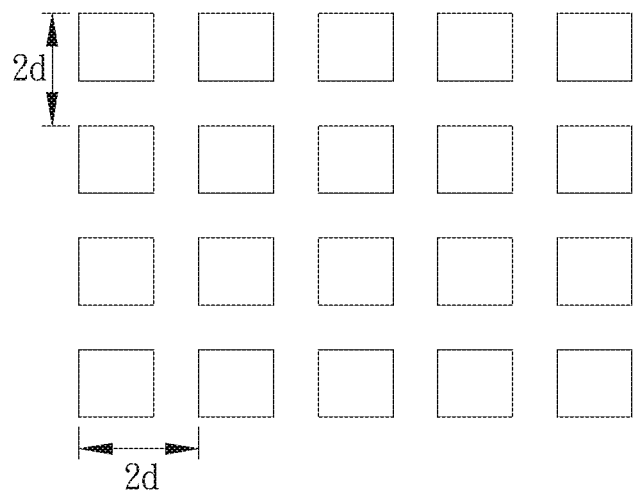
FIG. 12A, FIG. 12B and FIG. 12C illustrate schematic diagrams of the first fingerprint pattern obtained by the capacitive fingerprint sensing apparatus in the self-capacitive sensing mode, the second fingerprint pattern obtained by the capacitive fingerprint sensing apparatus in the mutual-capacitive sensing mode and the synthesized fingerprint pattern obtained by combining the first fingerprint pattern with the second fingerprint pattern.

In addition, as shown in FIG. 9, during the periods of the times T1~T5, there are sensing signals on the sensing lines S1~S7; that is to say, during the periods of the times T1~T5, the sensing driver 22 of the capacitive fingerprint sensing apparatus 2 performs self-capacitive sensing on the six rows of sensing electrodes through the sensing lines S1~S7 respectively to obtain the first fingerprint pattern FP1' (as shown in FIG. 12A).

Figure 10:
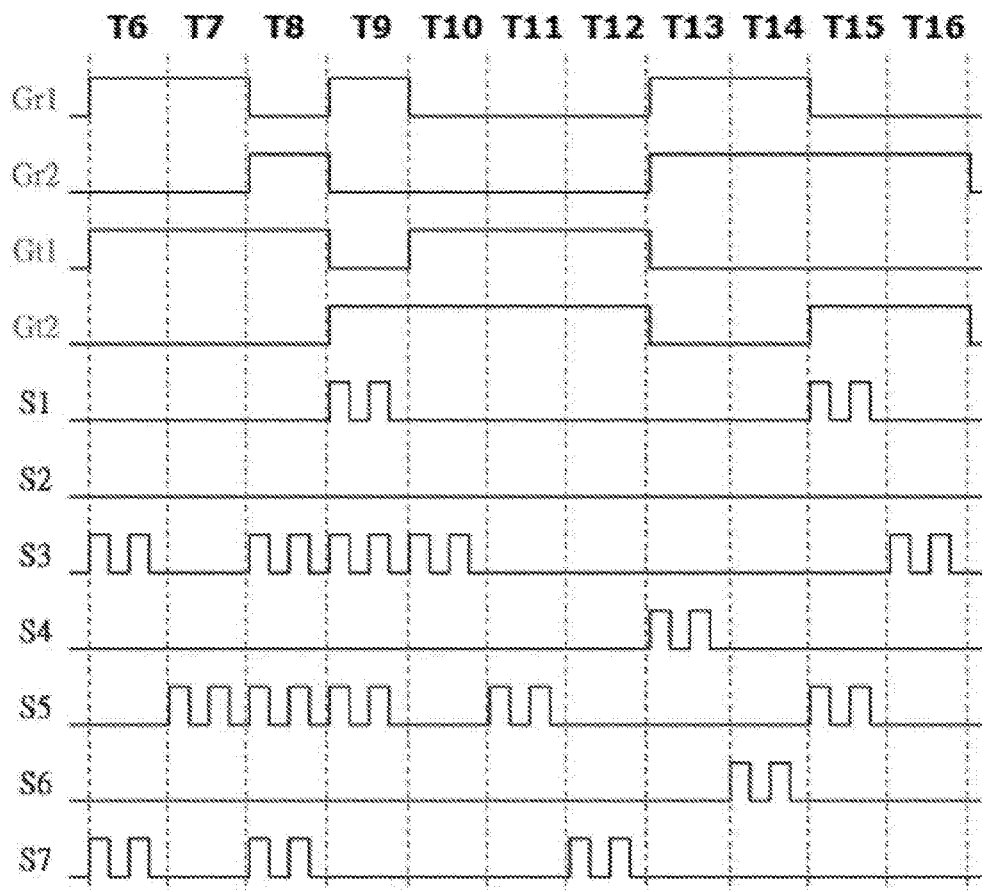
FIG. 10 illustrates a timing diagram of the capacitive fingerprint sensing apparatus in FIG. 8B scanning the odd rows of the sensing electrodes E11~E16, E31~E36 and E51~E56 and the even rows of the sensing electrodes E21~E26 and E41~E46 of the five rows of sensing electrodes E11~E16, E21~E26, E31~E36, E41~E46 and E51~E56 through the scanning lines Gr1~Gr5 and the scanning lines Gt1~Gt5 of the five pairs of scanning lines Gr1&Gt1, Gr2&Gt2, Gr3&Gt3, Gr4&Gt4 and Gr5&Gt5 respectively and performing mutual-capacitive sensing on the six columns of sensing electrodes E11~E51, E12~E52, E13~E53, E14~E54, E15~E55 and E16~E56 through the seven sensing lines S1~S7 respectively in the mutual-capacitive sensing mode.

Then, please refer to FIG. 8B and FIG. 10. FIG. 10 illustrates a timing diagram of the capacitive fingerprint sensing apparatus 2 in FIG. 8B scanning the odd rows of the sensing electrodes E11~E16, E31~E36 and E51~E56 and the even rows of the sensing electrodes E21~E26 and E41~E46 of the five rows of sensing electrodes E11~E16, E21~E26, E31~E36, E41~E46 and E51~E56 through the scanning lines Gr1~Gr5 and the scanning lines Gt1~Gt5 of the five pairs of scanning lines Gr1 &Gt1, Gr2&Gt2, Gr3&Gt3, Gr4&Gt4 and Gr5&Gt5 respectively and performing mutual-capacitive sensing on the six columns of sensing electrodes E11~E51, E12~E52, E13~E53, E14~E54, E15~E55 and E16~E56 through the seven sensing lines S1~S7 respectively in the mutual-capacitive sensing mode.

Figure 11A:
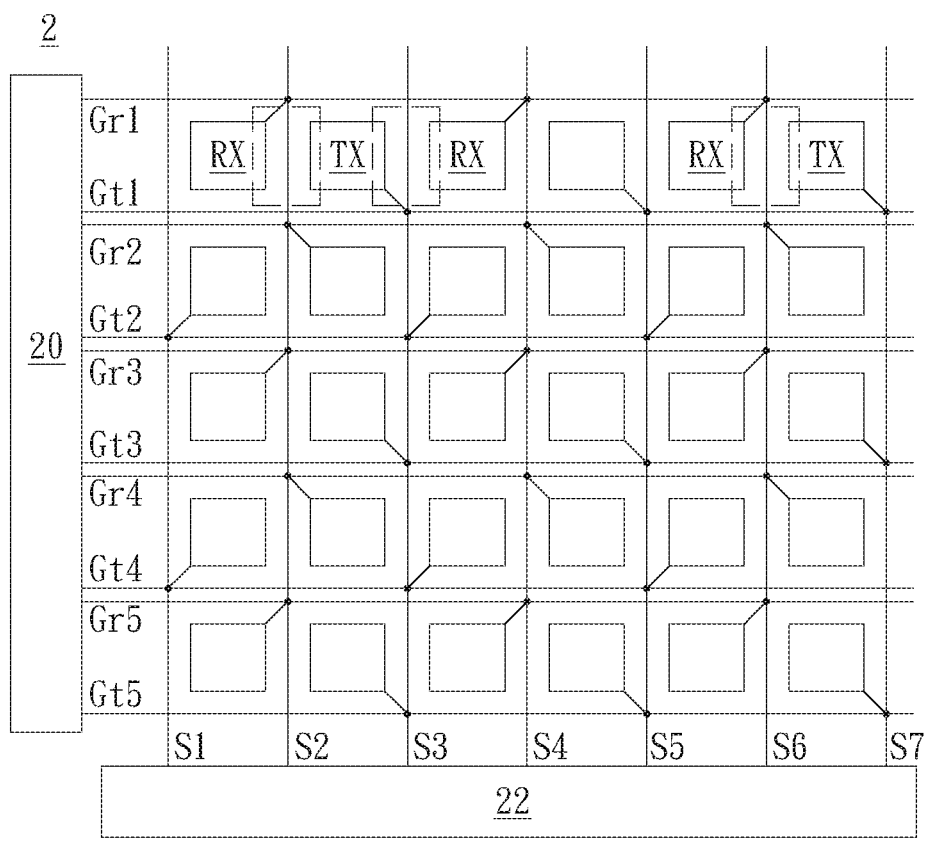
FIG. 11A~FIG. 11K illustrates schematic diagrams of the capacitive fingerprint sensing apparatus scanning the two rows of sensing electrodes E11~E15 and E21~E25 through the two pairs of scanning lines Gr1&Gt1 and Gr2&Gt2 and performing mutual-capacitive sensing during the times T6~T16 in FIG. 10.

As shown in FIG. 10, taking the first row of sensing electrodes E11~E16 and the second row of sensing electrodes E21~E26 for example, during the period of the time T6, the scanning signals of the first pair of scanning lines Gr1 & Gt1 are both at high-level and the scanning signals of the second pair of scanning lines Gr2 & Gt2 are at low-level. That is to say, the first pair of scanning lines Gr1 & Gt1 are used to scan the first row of sensing electrodes E11~E16 during the period of the time T6. As shown in FIG. 11A, the sensing electrodes E11, E13 and E15 are used as the receiver electrodes RX of mutual-capacitive sensing and the sensing electrodes E12 and E16 are used as the transmitter electrodes TX of mutual-capacitive sensing, wherein the sensing electrode E12 used as the transmitter electrode TX and the sensing electrodes E11 and E13 used as the receiver electrodes RX in the first row of sensing electrodes are adjacent to each other along the horizontal direction; the sensing electrode E16 used as the transmitter electrode TX and the sensing electrode E15 used as the receiver electrode RX in the first row of sensing electrodes are adjacent to each other along the horizontal direction. At this time, there are mutual-capacitive sensing signals on the sensing lines S3 and S7 which are coupled to the sensing electrodes E12 and E16 used as the transmitter electrodes TX in the first row of sensing electrodes, while no mutual-capacitive sensing signals on the other sensing lines S1~S2 and S4~S6.

Figure 11B:
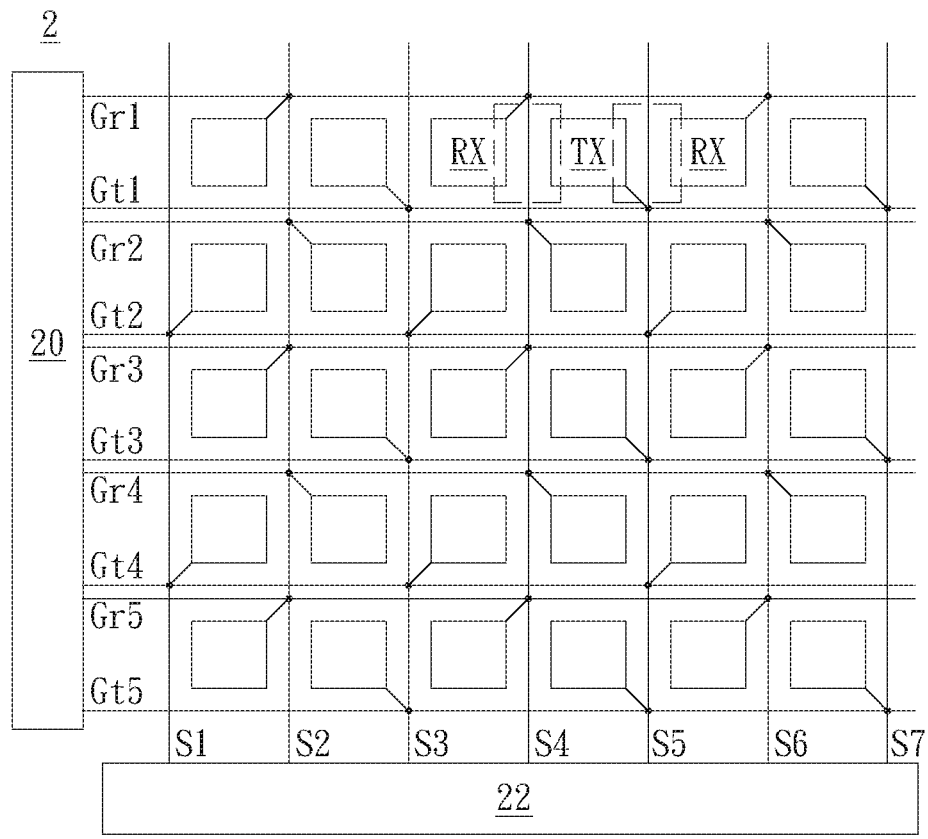

Similarly, please refer to FIG. 10 and FIG. 11B. During the period of the time T7, the scanning signals of the first pair of scanning lines Gr1 & Gt1 are both at high-level and the scanning signals of the second pair of scanning lines Gr2 & Gt2 are at low-level. That is to say, the first pair of scanning lines Gr1 & Gt1 are used to scan the first row of sensing electrodes E11~E16 during the period of the time T7. The sensing electrodes E13 and E15 are used as the receiver electrodes RX of mutual-capacitive sensing and the sensing electrode E14 is used as the transmitter electrode TX of mutual-capacitive sensing, wherein the sensing electrode E14 used as the transmitter electrode TX and the sensing electrodes E13 and E15 used as the receiver electrodes RX in the first row of sensing electrodes are adjacent to each other along the horizontal direction. At this time, there is a mutual-capacitive sensing signal on the sensing line S5 which is coupled to the sensing electrode E14 used as the transmitter electrodes TX in the first row of sensing electrodes, while no mutual-capacitive sensing signals on the other sensing lines S1~S4 and S6~S7.

Figure 11C:
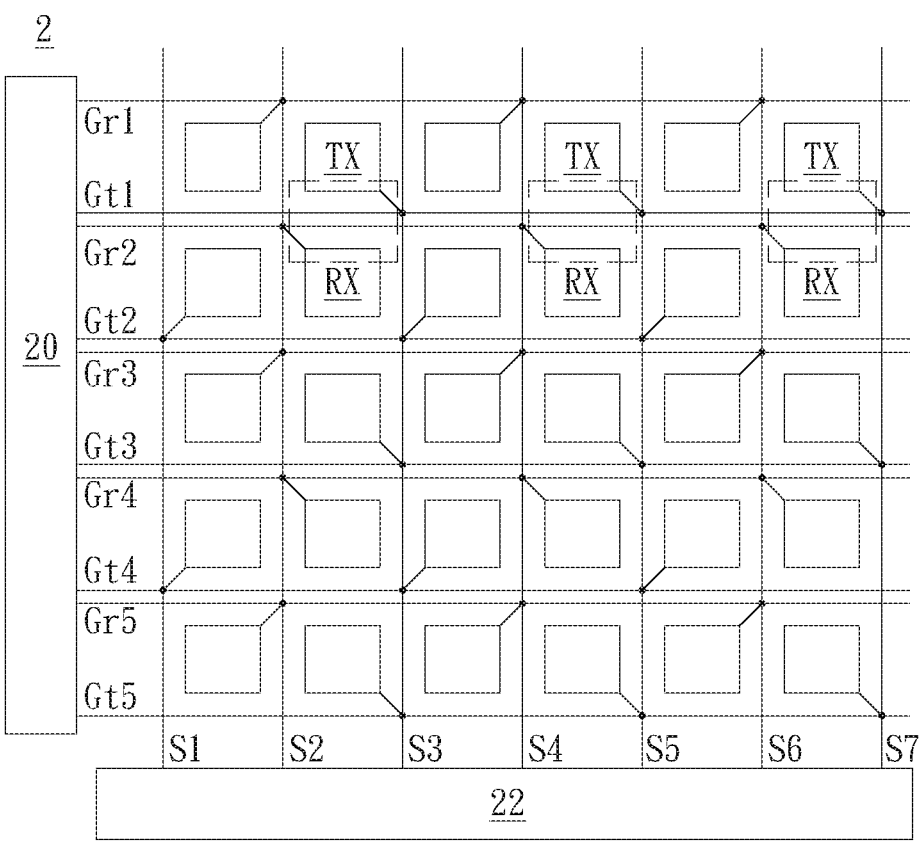

Then, please refer to FIG. 10 and FIG. 11C, during the period of the time T8, the scanning signal on the scanning line Gr1 is changed from high-level to low-level and the scanning signal on the scanning line Gr2 is changed from low-level to high-level, while the scanning signal on the scanning line Gt1 is maintained at high-level and the scanning signal on the scanning line Gt2 is maintained at low-level. That is to say, during the period of the time T8, the scanning line Gt1 of the first pair of scanning lines and the scanning line Gr2 of the second pair of scanning lines are used to scan the first row of sensing electrodes E11~E16 and the second row of sensing electrodes E21~E26 respectively. The sensing electrodes E12, E14 and E16 of the first row of sensing electrodes are used as the transmitter electrodes TX of mutual-capacitive sensing and the sensing electrodes E22, E24 and E26 of the second row of sensing electrodes are used as the receiver electrodes RX of mutual-capacitive sensing, wherein the sensing electrode E12 used as the transmitter electrode TX in the first row of sensing electrodes E11~E16 and the sensing electrode E22 used as the receiver electrode RX in the second row of sensing electrodes E21~E26 are adjacent to each other along the vertical direction; the sensing electrode E14 used as the transmitter electrode TX in the first row of sensing electrodes E11~E16 and the sensing electrode E24 used as the receiver electrode RX in the second row of sensing electrodes E21~E26 are adjacent to each other along the vertical direction; the sensing electrode E16 used as the transmitter electrode TX in the first row of sensing electrodes E11~E16 and the sensing electrode E26 used as the receiver electrode RX in the second row of sensing electrodes E21~E26 are adjacent to each other along the vertical direction. At this time, there are mutual-capacitive sensing signals on the sensing lines S3, S5 and S7 which are coupled to the sensing electrodes E12, E14 and E16 used as the transmitter electrodes TX in the first row of sensing electrodes, while no mutual-capacitive sensing signals on the other sensing lines S1~S2, S4 and S6.

Figure 11D:
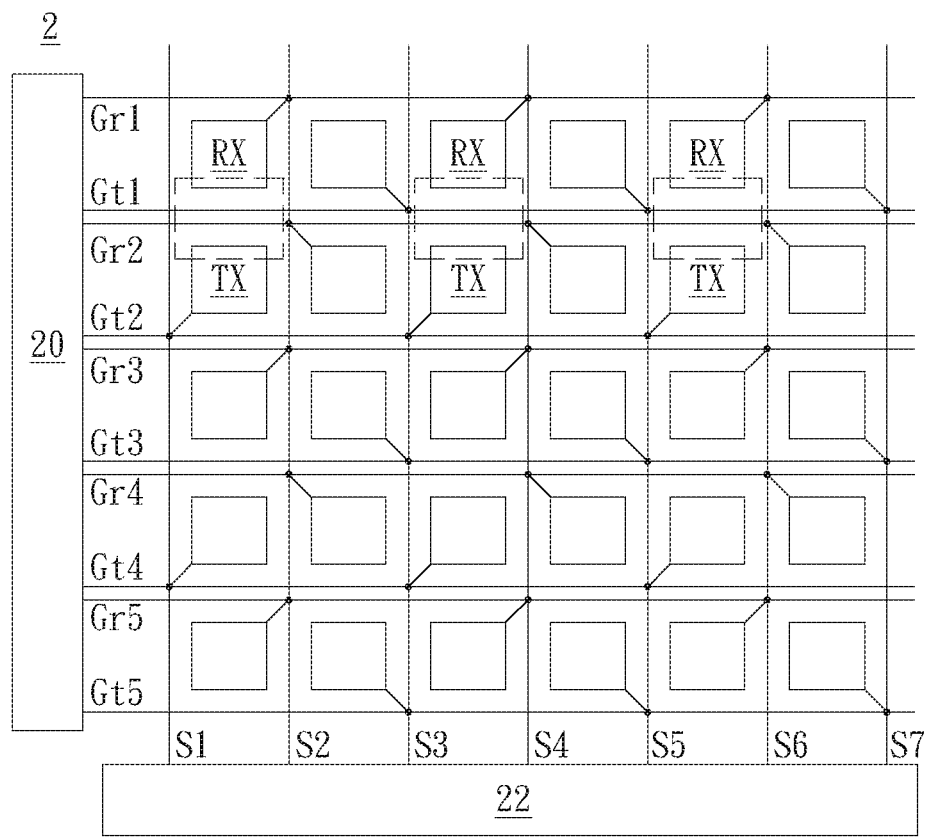

Then, please refer to FIG. 10 and FIG. 11D, during the period of the time T9, the scanning signal on the scanning line Gr1 is changed from low-level to high-level again and the scanning signal on the scanning line Gr2 is changed from high-level to low-level again, while the scanning signal on the scanning line Gt1 is changed from high-level to low-level and the scanning signal on the scanning line Gt2 is changed from low-level to high-level. That is to say, during the period of the time T9, the scanning line Gr1 of the first pair of scanning lines and the scanning line Gt2 of the second pair of scanning lines are used to scan the first row of sensing electrodes E11~E16 and the second row of sensing electrodes E21~E26 respectively. The sensing electrodes E11, E13 and E15 of the first row of sensing electrodes are used as the receiver electrodes RX of mutual-capacitive sensing and the sensing electrodes E21, E23 and E25 of the second row of sensing electrodes are used as the transmitter electrodes TX of mutual-capacitive sensing, wherein the sensing electrode E21 used as the transmitter electrode TX in the second row of sensing electrodes E21~E26 and the sensing electrode E11 used as the receiver electrode RX in the first row of sensing electrodes E11~E16 are adjacent to each other along the vertical direction; the sensing electrode E23 used as the transmitter electrode TX in the second row of sensing electrodes E21~E26 and the sensing electrode E13 used as the receiver electrode RX in the first row of sensing electrodes E11~E16 are adjacent to each other along the vertical direction; the sensing electrode E25 used as the transmitter electrode TX in the second row of sensing electrodes E21~E26 and the sensing electrode E15 used as the receiver electrode RX in the first row of sensing electrodes E11~E16 are adjacent to each other along the vertical direction. At this time, there are mutual-capacitive sensing signals on the sensing lines S1, S3 and S5 which are coupled to the sensing electrodes E21, E23 and E25 used as the transmitter electrodes TX in the second row of sensing electrodes, while no mutual-capacitive sensing signals on the other sensing lines S2, S4 and S6~S7.

Figure 11E:
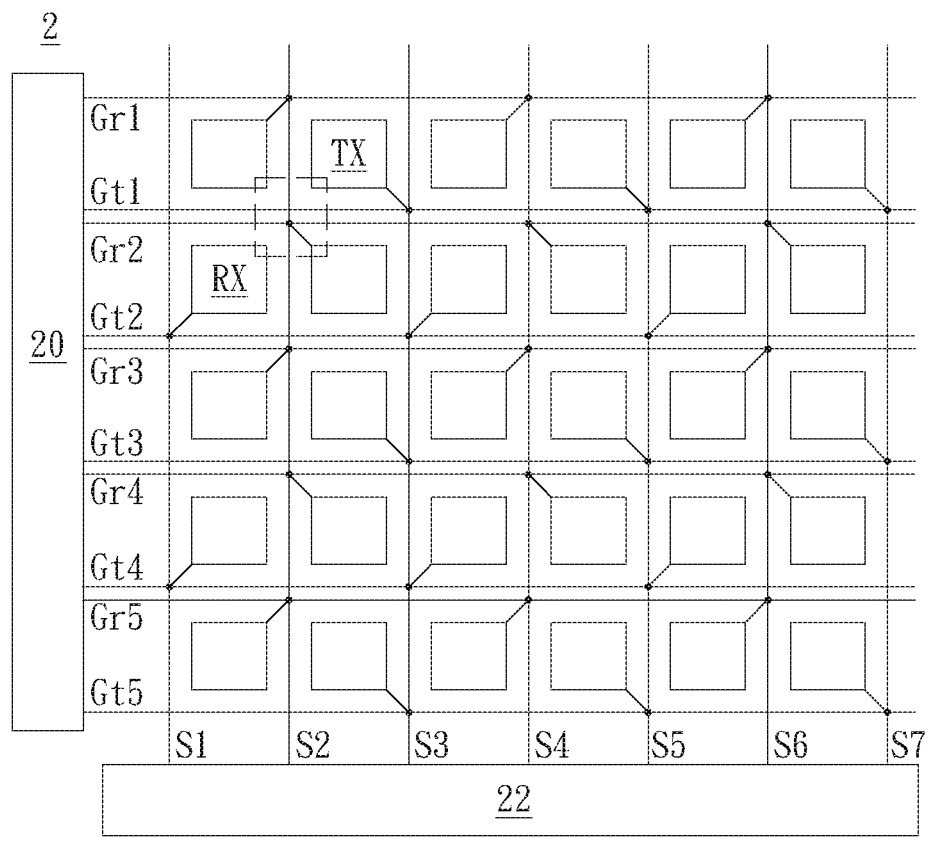

Please refer to FIG. 10 and FIG. 11E, during the period of the time T10, the scanning signal on the scanning line Gr1 is changed from high-level to low-level and the scanning signal on the scanning line Gr2 is maintained at low-level, while the scanning signal on the scanning line Gt1 is changed from low-level to high-level and the scanning signal on the scanning line Gt2 is maintained at high-level. That is to say, during the period of the time T10, the scanning line Gt1 of the first pair of scanning lines and the scanning line Gt2 of the second pair of scanning lines are used to scan the first row of sensing electrodes E11~E16 and the second row of sensing electrodes E21~E26 respectively. At this time, the sensing electrode E12 of the first row of sensing electrodes are used as the transmitter electrode TX of mutual-capacitive sensing and the sensing electrode E21 of the second row of sensing electrodes is used as the receiver electrode RX of mutual-capacitive sensing, wherein the sensing electrode E12 used as the transmitter electrode TX in the first row of sensing electrodes E11~E16 and the sensing electrode E21 used as the receiver electrode RX in the second row of sensing electrodes E21~E26 are adjacent to each other along an oblique angle of 45°. At this time, there is a mutual-capacitive sensing signal on the sensing line S3 which is coupled to the sensing electrode E12 used as the transmitter electrode TX in the first row of sensing electrodes, while no mutual-capacitive sensing signals on the other sensing lines S1~S2 and S4~S7.

Figure 11F:
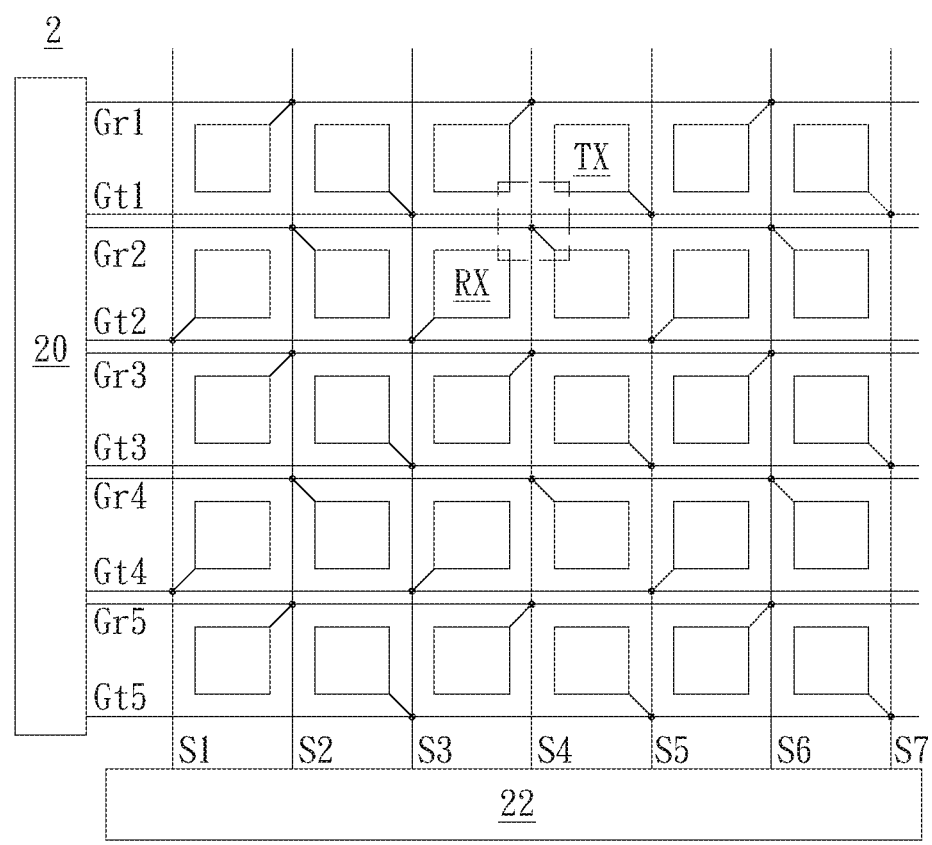

Please refer to FIG. 10 and FIG. 11F, during the period of the time T11, the scanning signals on the scanning line Gr1 and the scanning line Gr2 are both maintained at low-level, while the scanning signals on the scanning lines Gt1 and Gt2 are both maintained at high-level. That is to say, during the period of the time T11, the scanning line Gt1 of the first pair of scanning lines and the scanning line Gt2 of the second pair of scanning lines are used to scan the first row of sensing electrodes E11~E16 and the second row of sensing electrodes E21~E26 respectively. At this time, the sensing electrode E14 of the first row of sensing electrodes is used as the transmitter electrode TX of mutual-capacitive sensing and the sensing electrode E23 of the second row of sensing electrodes is used as the receiver electrode RX of mutual-capacitive sensing, wherein the sensing electrode E14 used as the transmitter electrode TX in the first row of sensing electrodes E11~E16 and the sensing electrode E23 used as the receiver electrode RX in the second row of sensing electrodes E21~E26 are adjacent to each other along an oblique angle of 45°. At this time, there is a mutual-capacitive sensing signal on the sensing line S5 which is coupled to the sensing electrode E14 used as the transmitter electrode TX in the first row of sensing electrodes, while no mutual-capacitive sensing signals on the other sensing lines S1~S4 and S6~S7.

Figure 11G:
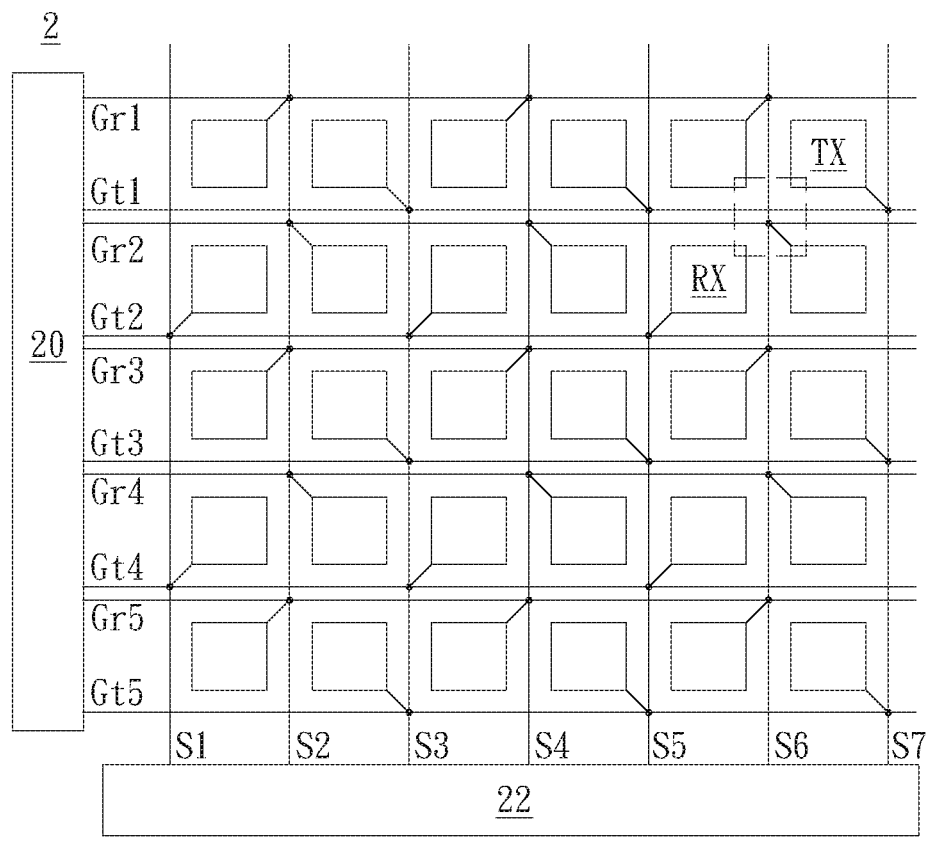

Please refer to FIG. 10 and FIG. 11G, during the period of the time T12, the scanning signals on the scanning line Gr1 and the scanning line Gr2 are both maintained at low-level, while the scanning signals on the scanning lines Gt1 and Gt2 are both maintained at high-level. That is to say, during the period of the time T12, the scanning line Gt1 of the first pair of scanning lines and the scanning line Gt2 of the second pair of scanning lines are used to scan the first row of sensing electrodes E11~E16 and the second row of sensing electrodes E21~E26 respectively. At this time, the sensing electrode E16 of the first row of sensing electrodes is used as the transmitter electrode TX of mutual-capacitive sensing and the sensing electrode E25 of the second row of sensing electrodes is used as the receiver electrode RX of mutual-capacitive sensing, wherein the sensing electrode E16 used as the transmitter electrode TX in the first row of sensing electrodes E11~E16 and the sensing electrode E25 used as the receiver electrode RX in the second row of sensing electrodes E21~E26 are adjacent to each other along an oblique angle of 45°. At this time, there is a mutual-capacitive sensing signal on the sensing line S7 which is coupled to the sensing electrode E16 used as the transmitter electrode TX in the first row of sensing electrodes, while no mutual-capacitive sensing signals on the other sensing lines S1~S6.

Figure 11H:
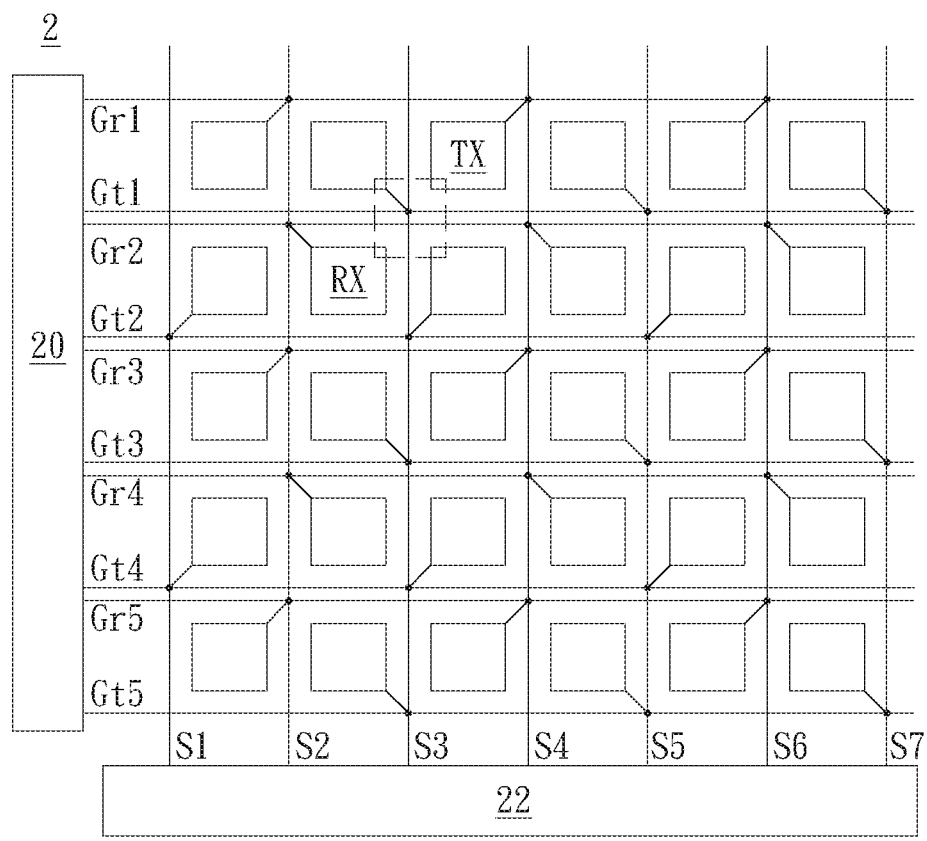

Please refer to FIG. 10 and FIG. 11H, during the period of the time T13, the scanning signals on the scanning line Gr1 and the scanning line Gr2 are both changed from low-level to high-level, while the scanning signals on the scanning lines Gt1 and Gt2 are both changed from high-level to low-level. That is to say, during the period of the time T13, the scanning line Gr1 of the first pair of scanning lines and the scanning line Gr2 of the second pair of scanning lines are used to scan the first row of sensing electrodes E11~E16 and the second row of sensing electrodes E21~E26 respectively. At this time, the sensing electrode E13 of the first row of sensing electrodes is used as the transmitter electrode TX of mutual-capacitive sensing and the sensing electrode E22 of the second row of sensing electrodes is used as the receiver electrode RX of mutual-capacitive sensing, wherein the sensing electrode E13 used as the transmitter electrode TX in the first row of sensing electrodes E11~E16 and the sensing electrode E22 used as the receiver electrode RX in the second row of sensing electrodes E21~E26 are adjacent to each other along an oblique angle of 45°. At this time, there is a mutual-capacitive sensing signal on the sensing line S4 which is coupled to the sensing electrode E13 used as the transmitter electrode TX in the first row of sensing electrodes, while no mutual-capacitive sensing signals on the other sensing lines S1~S3 and S5~S7.

Figure 11I:
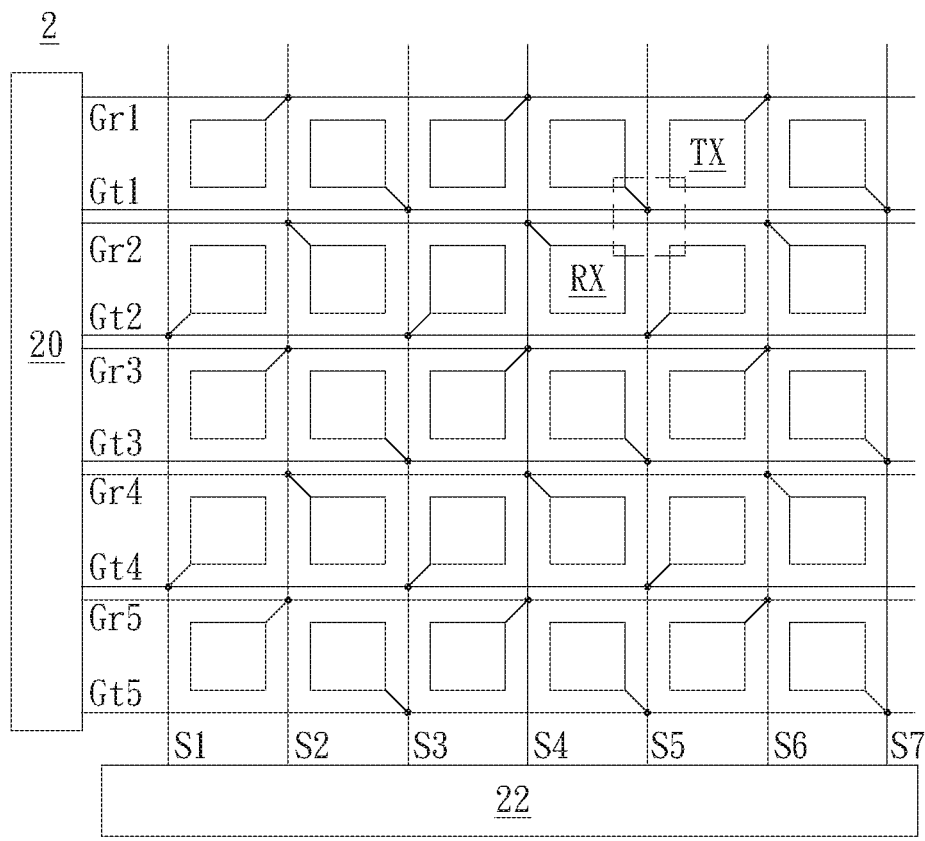

Please refer to FIG. 10 and FIG. 11I, during the period of the time T14, the scanning signals on the scanning line Gr1 and the scanning line Gr2 are both maintained at high-level, while the scanning signals on the scanning lines Gt1 and Gt2 are both maintained at low-level. That is to say, during the period of the time T14, the scanning line Gt1 of the first pair of scanning lines and the scanning line Gt2 of the second pair of scanning lines are used to scan the first row of sensing electrodes E11~E16 and the second row of sensing electrodes E21~E26 respectively. At this time, the sensing electrode E15 of the first row of sensing electrodes is used as the transmitter electrode TX of mutual-capacitive sensing and the sensing electrode E24 of the second row of sensing electrodes is used as the receiver electrode RX of mutual-capacitive sensing, wherein the sensing electrode E15 used as the transmitter electrode TX in the first row of sensing electrodes E11~E16 and the sensing electrode E24 used as the receiver electrode RX in the second row of sensing electrodes E21~E26 are adjacent to each other along an oblique angle of 45°. At this time, there is a mutual-capacitive sensing signal on the sensing line S6 which is coupled to the sensing electrode E15 used as the transmitter electrode TX in the first row of sensing electrodes, while no mutual-capacitive sensing signals on the other sensing lines S1~S5 and S7.

Figure 11J:
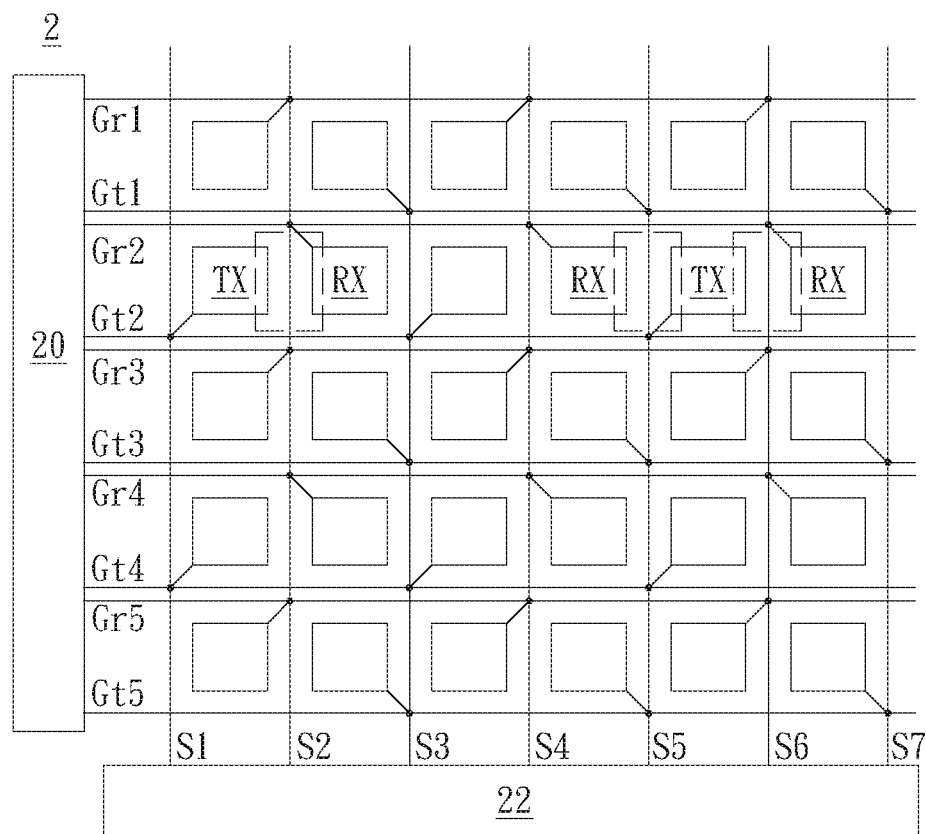

Then, please refer to FIG. 10 and FIG. 11J, during the period of the time T15, the scanning signal on the scanning line Gr1 is changed from high-level to low-level and the scanning signal on the scanning line Gr2 is maintained at high-level, while the scanning signal on the scanning line Gt1 is maintained at low-level and the scanning signal on the scanning line Gt2 is changed from low-level to high-level. That is to say, during the period of the time T15, the scanning lines Gr2 and Gt2 of the second pair of scanning lines are used to scan the second row of sensing electrodes E21~E26. At this time, the sensing electrodes E21 and E25 of the second row of sensing electrodes are used as the transmitter electrode TX of mutual-capacitive sensing and the sensing electrodes E22, E24 and E26 of the second row of sensing electrodes are used as the receiver electrodes RX of mutual-capacitive sensing, wherein the sensing electrode E21 used as the transmitter electrode TX in the second row of sensing electrodes E21~E26 and the sensing electrode E22 used as the receiver electrode RX in the second row of sensing electrodes E21~E26 are adjacent to each other along the horizontal direction; the sensing electrode E25 used as the transmitter electrode TX in the second row of sensing electrodes E21~E26 and the sensing electrodes E24 and E26 used as the receiver electrode RX in the second row of sensing electrodes E21~E26 are adjacent to each other along the horizontal direction. At this time, there are mutual-capacitive sensing signals on the sensing lines S1 and S5 which are coupled to the sensing electrodes E21 and E25 used as the transmitter electrodes TX in the second row of sensing electrodes, while no mutual-capacitive sensing signals on the other sensing lines S2~S4 and S6~S7.

Figure 11K:
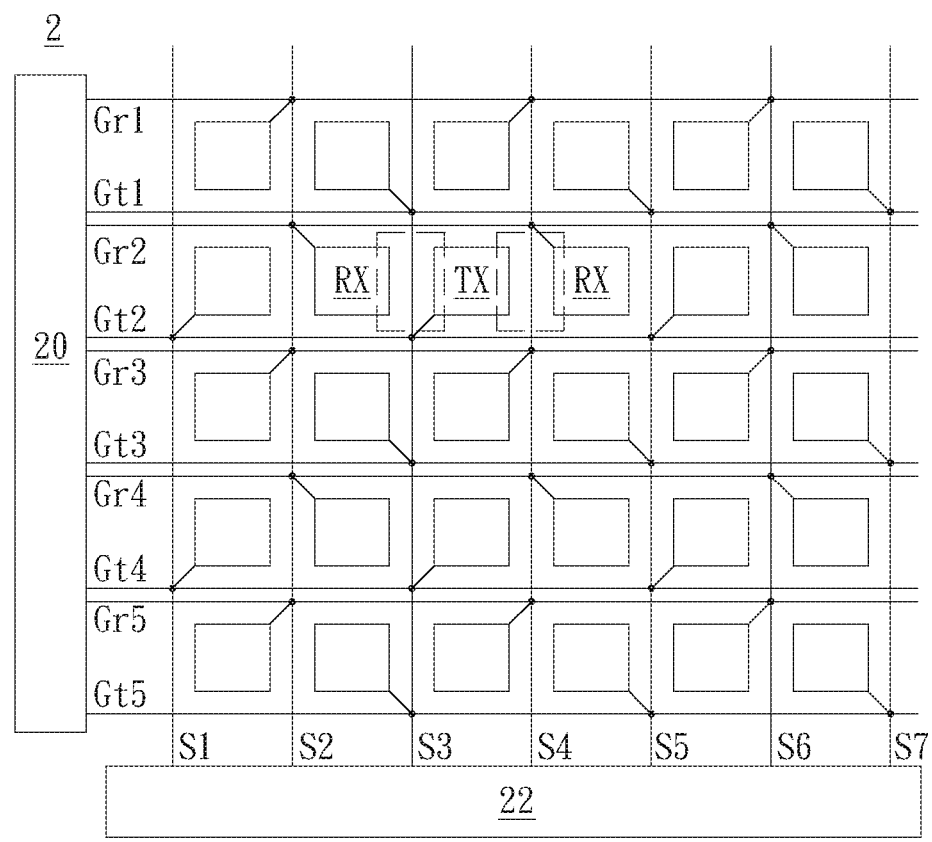

Afterwards, please refer to FIG. 10 and FIG. 11K. During the period of the time T16, the scanning signals on the first pair of scanning lines Gr1 & Gt1 and the second pair of scanning lines Gr2 & Gt2 are maintained at their original voltage levels. That is to say, the second pair of scanning lines Gr2 & Gt2 is used to scan the second row of sensing electrodes E21~E26. At this time, the sensing electrodes E22 and E24 of the second row of sensing electrodes are used as the receiver electrodes RX of mutual-capacitive sensing and the sensing electrode E23 of the second row of sensing electrodes is used as the transmitter electrode TX of mutual-capacitive sensing, wherein the sensing electrode E23 used as the transmitter electrode TX in the second row of sensing electrodes E21~E26 and the sensing electrodes E22 and E24 used as the receiver electrode RX in the second row of sensing electrodes E21~E26 are adjacent to each other along the horizontal direction. At this time, there is mutual-capacitive sensing signal on the sensing line S3 which is coupled to the sensing electrode E23 used as the transmitter electrodes TX in the second row of sensing electrodes, while no mutual-capacitive sensing signals on the other sensing lines S1~S2 and S4~S7.

Figure 12B:
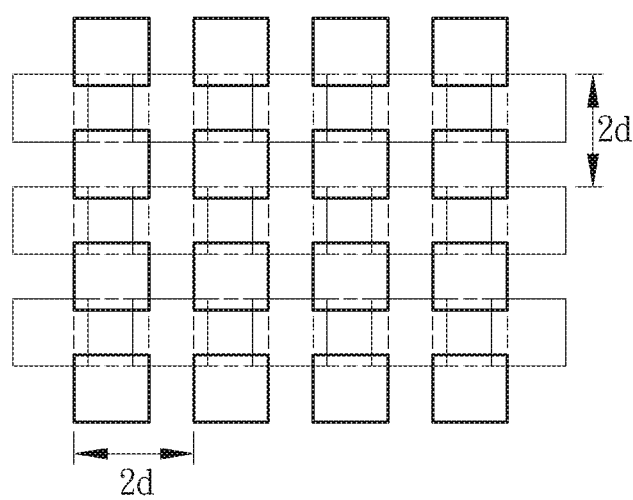

It should be noted that in the mutual-capacitive sensing mode, the scanning driver 20 of the invention scans the plurality of sensing electrodes through a plurality of scanning lines G1~G4 and then the sensing driver 22 performs mutual capacitive sensing on at least one pair of adjacent sensing electrodes of the plurality of sensing electrodes through a plurality of sensing lines S1~S5 to obtain the second fingerprint pattern FP2' as shown in FIG. 12B.

It should be specially noticed that, as shown in FIG. 12B, the at least one pair of adjacent sensing electrodes can be sensing electrodes adjacent along the first direction (the horizontal direction) and the obtained mutual capacitive sensing patterns can be the blocks formed by thicker lines in the second fingerprint pattern FP2'; the at least one pair of adjacent sensing electrodes can be sensing electrodes adjacent along the second direction (the vertical direction) and the obtained mutual capacitive sensing patterns can be the blocks formed by thinner lines in the second fingerprint pattern FP2'; the at least one pair of adjacent sensing electrodes can be sensing electrodes adjacent to each other along any other oblique angle (e.g., 45°) and the obtained mutual capacitive sensing patterns can be the blocks formed by dotted lines in the second fingerprint pattern FP2', but not limited to this.

Figure 12C:
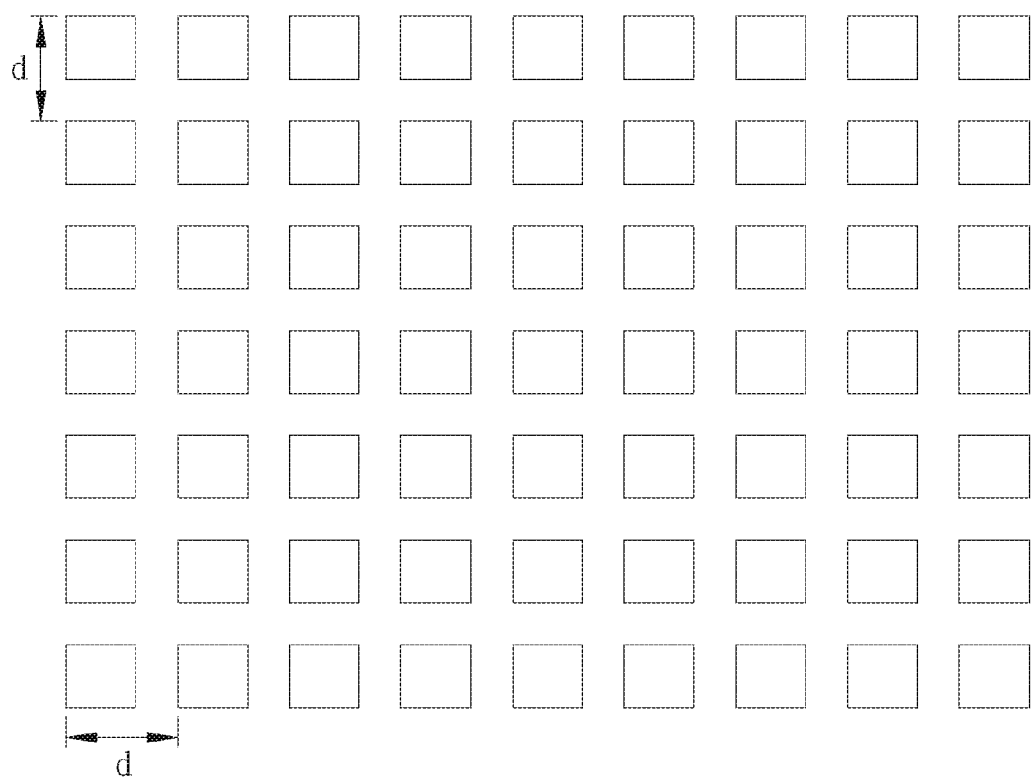

Then, the capacitive fingerprint sensing apparatus 2 combines the self-capacitive sensed first fingerprint pattern FP1' of FIG. 12A and the mutual-capacitive sensed second fingerprint pattern FP2' of FIG. 12B into a synthesized fingerprint pattern FP3' as shown in FIG. 12C. After comparing FIG. 12A-FIG. 12C, it can be found that, as to the vertical direction (Y-direction), the length d between the same side of any two adjacent sensing patterns in the same row of sensing patterns of the synthesized fingerprint pattern FP3' as shown in FIG. 12C is half of the length 2d between the same side of any two adjacent sensing patterns in the same row of sensing patterns of the first fingerprint pattern FP1' of FIG. 12A and the second fingerprint pattern FP2' of FIG. 12B. In other words, the resolution of the synthesized fingerprint pattern FP3' of FIG. 12C along the vertical direction (Y-direction) is twice of the resolution of the first fingerprint pattern FP1' of FIG. 12A and the second fingerprint pattern FP2' of FIG. 12B along the vertical direction (Y-direction).

As to the horizontal direction (X-direction), the length d between the same side of any two adjacent sensing patterns in the same row of sensing patterns of the synthesized fingerprint pattern FP3' as shown in FIG. 12C is half of the length 2d between the same side of any two adjacent sensing patterns in the same row of sensing patterns of the first fingerprint pattern FP1' of FIG. 12A and the second fingerprint pattern FP2' of FIG. 12B. In other words, the resolution of the synthesized fingerprint pattern FP3' of FIG. 12C along the horizontal direction (X-direction) is twice of the resolution of the first fingerprint pattern FP1' of FIG. 12A and the second fingerprint pattern FP2' of FIG. 12B along the horizontal direction (X-direction). From above, it can be found that the entire resolution of the synthesized fingerprint pattern FP3' of FIG. 12C is four times of the entire resolution of the first fingerprint pattern FP1' of FIG. 12A and the second fingerprint pattern FP2' of FIG. 12B.

Figure 13:
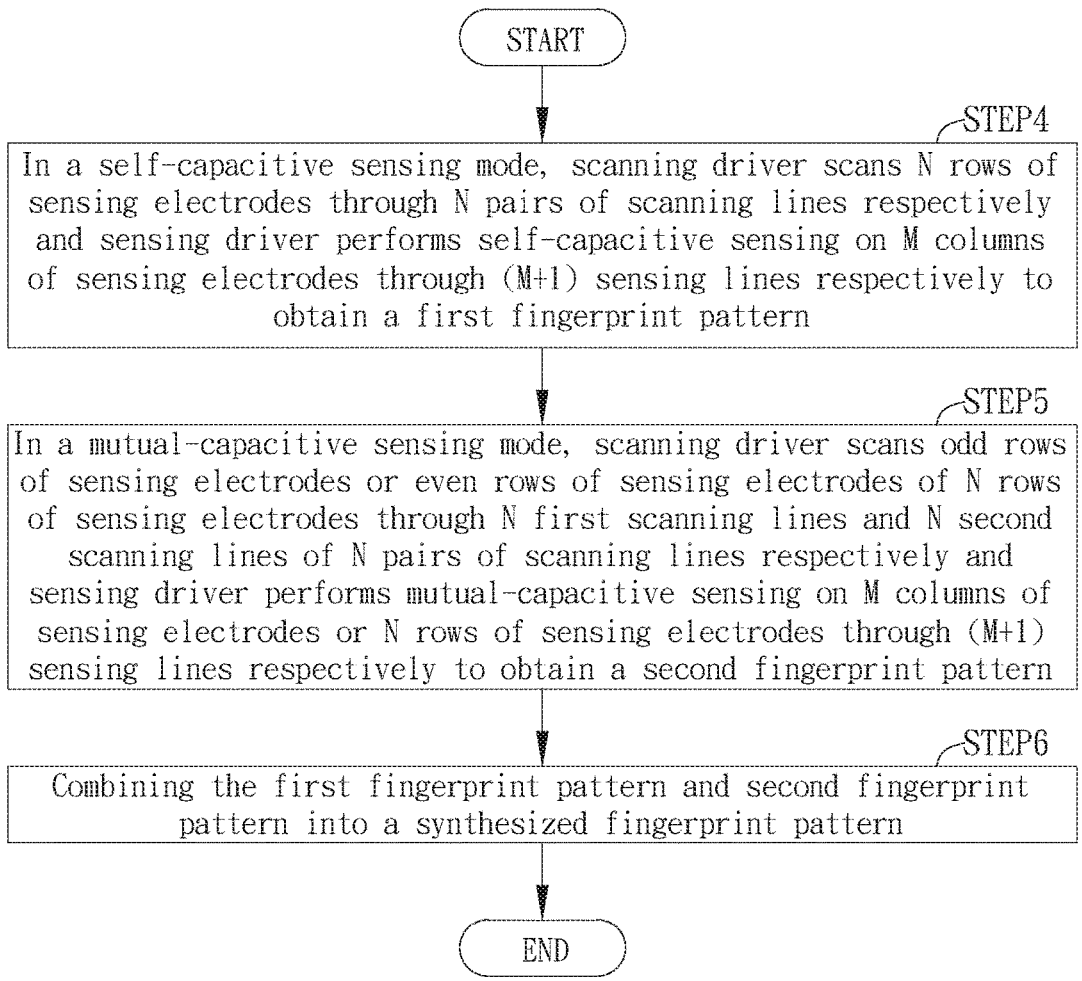
FIG. 13 illustrates a flowchart of the capacitive fingerprint sensing method in another preferred embodiment of the invention.

Then, please refer to FIG. 13. FIG. 13 illustrates a flowchart of the capacitive fingerprint sensing method in another preferred embodiment of the invention. As shown in FIG. 13, the capacitive fingerprint sensing method is realized by operating a capacitive fingerprint sensing apparatus. The capacitive fingerprint sensing apparatus includes a scanning driver, a sensing driver, a plurality of sensing electrodes, (M+1) sensing lines and N pairs of scanning lines. Each pair of scanning lines includes a first scanning line and a second scanning line. M and N are positive integers. The scanning driver is coupled to the N pairs of scanning lines. The sensing driver is coupled to the (M+1) sensing lines.

The plurality of sensing electrodes are arranged to form a (N*M) matrix having N rows of sensing electrodes and M columns of sensing electrodes, but not limited to this. The M columns of sensing electrodes are arranged along a first direction and coupled to the (M+1) sensing lines respectively in a Zig-Zag way and the N rows of sensing electrodes are arranged along a second direction and coupled to the N pairs of scanning lines respectively.

As shown in FIG. 13, in STEP4, in a self-capacitive sensing mode, the scanning driver scans the N rows of sensing electrodes through the N pairs of scanning lines respectively and the sensing driver performs self-capacitive sensing on the M columns of sensing electrodes through the (M+1) sensing lines respectively to obtain a first fingerprint pattern. In STEP5, in a mutual-capacitive sensing mode, the scanning driver scans odd rows of sensing electrodes and even rows of sensing electrodes of the N rows of sensing electrodes through N first scanning lines and N second scanning lines of the N pairs of scanning lines respectively and then the sensing driver performs mutual-capacitive sensing on the M columns of sensing electrodes or the N rows of sensing electrodes through the (M+1) sensing lines respectively to obtain a second fingerprint pattern. In STEP6, the method combines the first fingerprint pattern and the second fingerprint pattern into a synthesized fingerprint pattern, wherein a resolution of the synthesized fingerprint pattern along at least one direction is larger than a resolution of the first fingerprint pattern and a resolution of the second fingerprint pattern along the at least one direction. That is to say, in at least one direction, the resolution of the synthesized fingerprint pattern will be higher than the resolution of the first fingerprint pattern and the resolution of the second fingerprint pattern.

Figure 14:
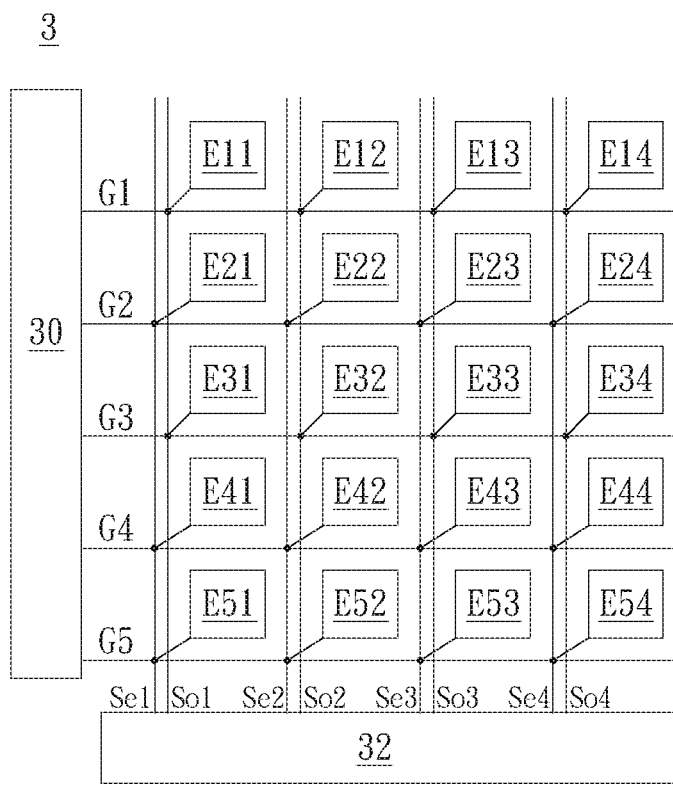
FIG. 14 illustrates a schematic diagram of the capacitive fingerprint sensing apparatus in another preferred embodiment of the invention.

Then, please refer to FIG. 14. FIG. 14 illustrates a schematic diagram of the capacitive fingerprint sensing apparatus in another preferred embodiment of the invention. As shown in FIG. 14, the capacitive fingerprint sensing apparatus 3 includes a scanning driver 30, a sensing driver 32, (5*4) sensing electrodes E11~E54, five scanning lines G1~G5 and four pairs of sensing lines Se1 & So1~Se4 & So4. Wherein, the five scanning lines G1~G5 are coupled to five rows of sensing electrodes E11~E14, E21~E24, E31~E34, E41~E44 and E51~E54. The four pairs of sensing lines Se1 & So1~Se4 & So4 correspond to four columns of sensing electrodes E11~E51, E12~E52, E13~E53 and E14~E54.

Taking the first column of sensing electrodes E11~E51 for example, the sensing electrode E11 is coupled to the node that the scanning line G1 connects with the sensing line So1; the sensing electrode E21 is coupled to the node that the scanning line G2 connects with the sensing line Se1; the sensing electrode E31 is coupled to the node that the scanning line G3 connects with the sensing line So1; the sensing electrode E41 is coupled to the node that the scanning line G4 connects with the sensing line Se1; the sensing electrode E51 is coupled to the node that the scanning line G5 connects with the sensing line Se1, and so on.

Figure 15:
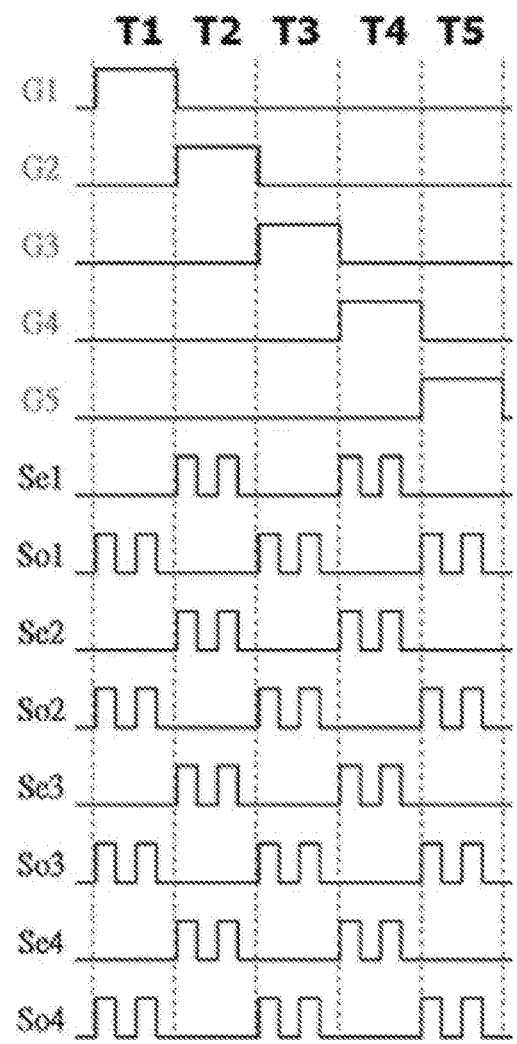
FIG. 15 illustrates a timing diagram of the capacitive fingerprint sensing apparatus in FIG. 14 scanning the five rows of sensing electrodes E11~E14, E21~E24, E31~E34, E41~E44 and E51~E54 through the scanning lines G1~G5 respectively during the times T1~T5 and performing self-capacitive sensing on the four columns of sensing electrodes E11~E51, E12~E52, E13~E53 and E14~E54 through the four pairs of sensing lines Se1&So1, Se2&So2, Se3&So3 and Se4&So4 respectively in the self-capacitive sensing mode.

Please refer to FIG. 15. FIG. 15 illustrates a timing diagram of the capacitive fingerprint sensing apparatus in FIG. 14 scanning the five rows of sensing electrodes E11~E14, E21~E24, E31~E34, E41~E44 and E51~E54 through the scanning lines G1~G5 respectively during the times T1~T5 and performing self-capacitive sensing on the four columns of sensing electrodes E11~E51, E12~E52, E13~E53 and E14~E54 through the four pairs of sensing lines Se1 & So1, Se2 & So2, Se3 & So3 and Se4 & So4 respectively in the self-capacitive sensing mode. As shown in FIG. 15, in the self-capacitive sensing mode, during the period of the time T1, the scanning signal on the scanning line G1 is at high-level and the scanning signals on the scanning lines G2~G5 are at low-level. That is to say, during the period of the time T1, the scanning driver 30 scans the first row of sensing electrodes E11~E14 through the scanning line G1. At this time, there are sensing signals on the sensing lines So1, So2, So3 and So4 of the four pairs of sensing lines Se1 & So1, Se2 & So2, Se3 & So3 and Se4 & So4 and no sensing signals on the sensing lines Se1, Se2, Se3 and Se4 of the four pairs of sensing lines Se1 & So1, Se2 & So2, Se3 & So3 and Se4 & So4.

During the period of the time T2, the scanning signal on the scanning line G2 is at high-level and the scanning signals on the scanning lines G1 and G3~G5 are at low-level. That is to say, during the period of the time T2, the scanning driver 30 scans the second row of sensing electrodes E21~E24 through the scanning line G2. At this time, there are sensing signals on the sensing lines Se1, Se2, Se3 and Se4 of the four pairs of sensing lines Se1 & So1, Se2 & So2, Se3 & So3 and Se4 & So4 and no sensing signals on the sensing lines So1, So2, So3 and So4 of the four pairs of sensing lines Se1 & So1, Se2 & So2, Se3 & So3 and Se4 & So4.

During the period of the time T3, the scanning signal on the scanning line G3 is at high-level and the scanning signals on the scanning lines G1~G2 and G4~G5 are at low-level. That is to say, during the period of the time T3, the scanning driver 30 scans the third row of sensing electrodes E31~E34 through the scanning line G3. At this time, there are sensing signals on the sensing lines So1, So2, So3 and So4 of the four pairs of sensing lines Se1 & So1, Se2 & So2, Se3 & So3 and Se4 & So4 and no sensing signals on the sensing lines Se1, Se2, Se3 and Se4 of the four pairs of sensing lines Se1 & So1, Se2 & So2, Se3 & So3 and Se4 & So4.

During the period of the time T3, the scanning signal on the scanning line G3 is at high-level and the scanning signals on the scanning lines G1~G2 and G4~G5 are at low-level. That is to say, during the period of the time T3, the scanning driver 30 scans the third row of sensing electrodes E31~E34 through the scanning line G3. At this time, there are sensing signals on the sensing lines So1, So2, So3 and So4 of the four pairs of sensing lines Se1 & So1, Se2 & So2, Se3 & So3 and Se4 & So4 and no sensing signals on the sensing lines Se1, Se2, Se3 and Se4 of the four pairs of sensing lines Se1 & So1, Se2 & So2, Se3 & So3 and Se4 & So4.

During the period of the time T4, the scanning signal on the scanning line G4 is at high-level and the scanning signals on the scanning lines G1~G3 and G5 are at low-level. That is to say, during the period of the time T4, the scanning driver 30 scans the fourth row of sensing electrodes E41~E44 through the scanning line G4. At this time, there are sensing signals on the sensing lines Se1, Se2, Se3 and Se4 of the four pairs of sensing lines Se1 & So1, Se2 & So2, Se3 & So3 and Se4 & So4 and no sensing signals on the sensing lines So1, So2, So3 and So4 of the four pairs of sensing lines Se1 & So1, Se2 & So2, Se3 & So3 and Se4 & So4.

During the period of the time T5, the scanning signal on the scanning line G5 is at high-level and the scanning signals on the scanning lines G1~G4 are at low-level. That is to say, during the period of the time T5, the scanning driver 30 scans the fifth row of sensing electrodes E51~E54 through the scanning line G5. At this time, there are sensing signals on the sensing lines So1, So2, So3 and So4 of the four pairs of sensing lines Se1 & So1, Se2 & So2, Se3 & So3 and Se4 & So4 and no sensing signals on the sensing lines Se1, Se2, Se3 and Se4 of the four pairs of sensing lines Se1 & So1, Se2 & So2, Se3 & So3 and Se4 & So4.

Figure 16:
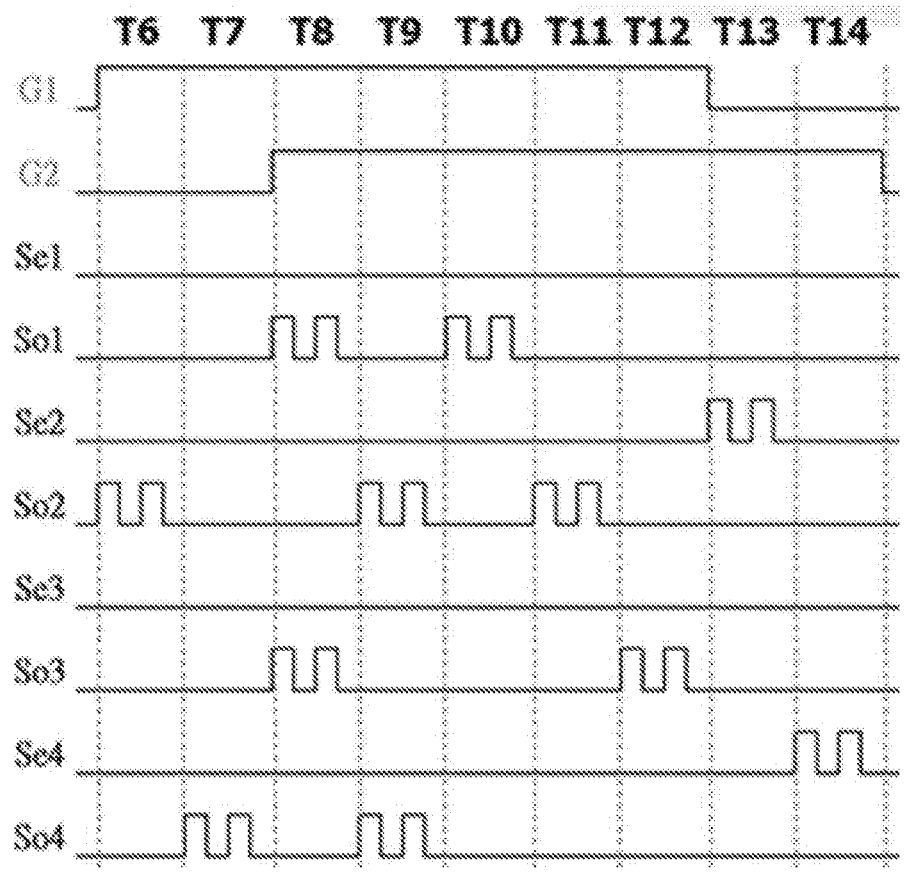
FIG. 16 illustrates a timing diagram of the capacitive fingerprint sensing apparatus in FIG. 14 scanning the two rows of sensing electrodes E11~E14 and E21~E24 through two scanning lines G1~G2 respectively during the times T6~T14 and performing mutual-capacitive sensing on the four columns of sensing electrodes E11~E51, E12~E52, E13~E53 and E14~E54 through the four pairs of sensing lines Se1&So1, Se2&So2, Se3&So3 and Se4&So4 respectively in the mutual-capacitive sensing mode.

Then, please refer to FIG. 16. FIG. 16 illustrates a timing diagram of the capacitive fingerprint sensing apparatus 3 in FIG. 14 scanning the two rows of sensing electrodes E11~E14 and E21~E24 through two scanning lines G1~G2 respectively during the times T6~T14 and performing mutual-capacitive sensing on the four columns of sensing electrodes E11~E51, E12~E52, E13~E53 and E14~E54 through the four pairs of sensing lines Se1&So1, Se2&So2, Se3&So3 and Se4&So4 respectively in the mutual-capacitive sensing mode. As shown in FIG. 16, in the mutual-capacitive sensing mode, during the period of the time T6, there is only the sensing signal on the scanning line G1 of the two scanning lines G1~G2 at high-level; that is to say, at this time, the scanning line G1 is used to scan the first row of sensing electrodes E11~E14.

Figure 17A:
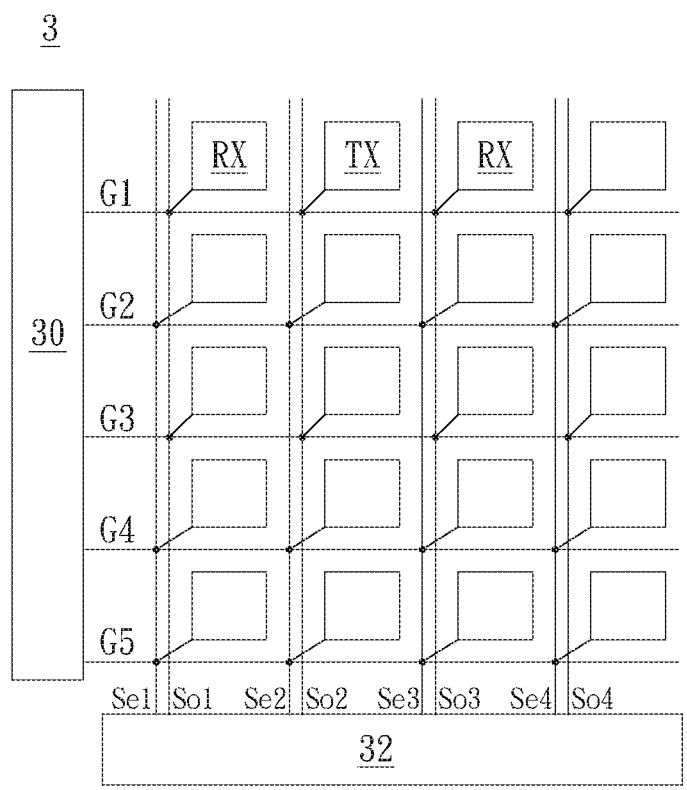
FIG. 17A~FIG. 17I illustrate schematic diagrams of the capacitive fingerprint sensing apparatus scanning the two rows of sensing electrodes E11~E14 and E21~E24 through the two scanning lines G1 and G2 and performing mutual-capacitive sensing respectively during the times T6~T14 in FIG. 16.

As shown in FIG. 17A, at this time, the sensing electrodes E11 and E13 of the first row of sensing electrodes E11~E14 are used as receiver electrodes RX of mutual-capacitive sensing and the sensing electrode E12 of the first row of sensing electrodes E11~E14 are used as transmitter electrode TX of mutual-capacitive sensing, wherein the sensing electrode E12 used as the transmitter electrode TX and the sensing electrodes E11 and E13 used as the receiver electrodes RX are adjacent to each other along the horizontal direction. As shown in FIG. 16, at this time, there is a mutual-capacitive sensing signal on the sensing line So2 coupled to the sensing electrode E12 used as the transmitter electrode TX and no mutual-capacitive sensing signals on the other sensing lines. Then, during the period of the time T7, there is only the sensing signal on the scanning line G1 of the two scanning lines G1~G2 at high-level; that is to say, at this time, the scanning line G1 is used to scan the first row of sensing electrodes E11~E14.

Figure 17B:
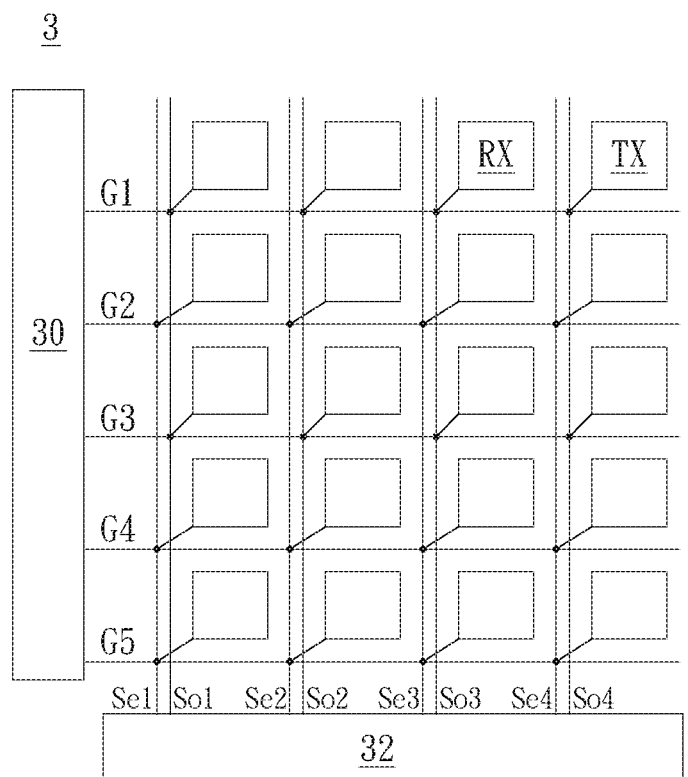

As shown in FIG. 17B, at this time, the sensing electrode E13 of the first row of sensing electrodes E11~E14 is used as receiver electrode RX of mutual-capacitive sensing and the sensing electrode E14 of the first row of sensing electrodes E11~E14 is used as transmitter electrode TX of mutual-capacitive sensing, wherein the sensing electrode E14 used as the transmitter electrode TX and the sensing electrode E13 used as the receiver electrode RX are adjacent to each other along the horizontal direction. As shown in FIG. 16, at this time, there is a mutual-capacitive sensing signal on the sensing line So4 coupled to the sensing electrode E14 used as the transmitter electrode TX and no mutual-capacitive sensing signals on the other sensing lines. Then, during the period of the time T8, the two scanning lines G1~G2 are both at high-level; that is to say, at this time, the scanning lines G1 and G2 are used to scan the first row of sensing electrodes E11~E14 and the second row of sensing electrodes E21~E24 respectively.

Figure 17C:
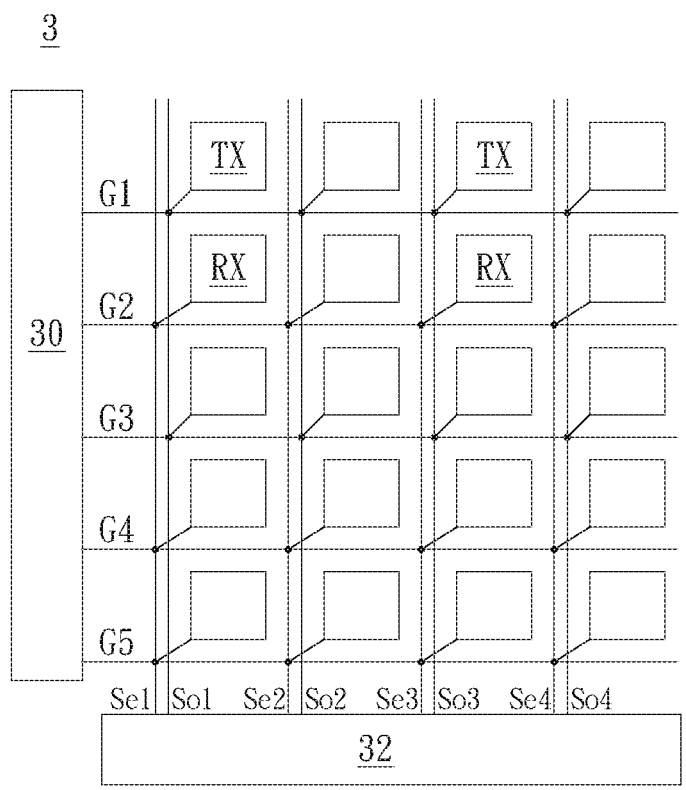

As shown in FIG. 17C, at this time, the sensing electrodes E11 and E13 of the first row of sensing electrodes E11~E14 are used as transmitter electrodes TX of mutual-capacitive sensing and the sensing electrodes E21 and E23 of the second row of sensing electrodes E21~E24 are used as receiver electrodes RX of mutual-capacitive sensing, wherein the sensing electrode E11 of the first row of sensing electrodes E11~E14 used as the transmitter electrode TX and the sensing electrode E21 of the second row of sensing electrodes E21~E24 used as the receiver electrodes RX are adjacent to each other along the vertical direction; the sensing electrode E13 of the first row of sensing electrodes E11~E14 used as the transmitter electrode TX and the sensing electrode E23 of the second row of sensing electrodes E21~E24 used as the receiver electrodes RX are adjacent to each other along the vertical direction. As shown in FIG. 16, at this time, there are mutual-capacitive sensing signals on the sensing lines So1 and So3 coupled to the sensing electrodes E11 and E13 of the first row of sensing electrodes E11~E14 used as the transmitter electrodes TX and no mutual-capacitive sensing signals on the other sensing lines.

Figure 17D:
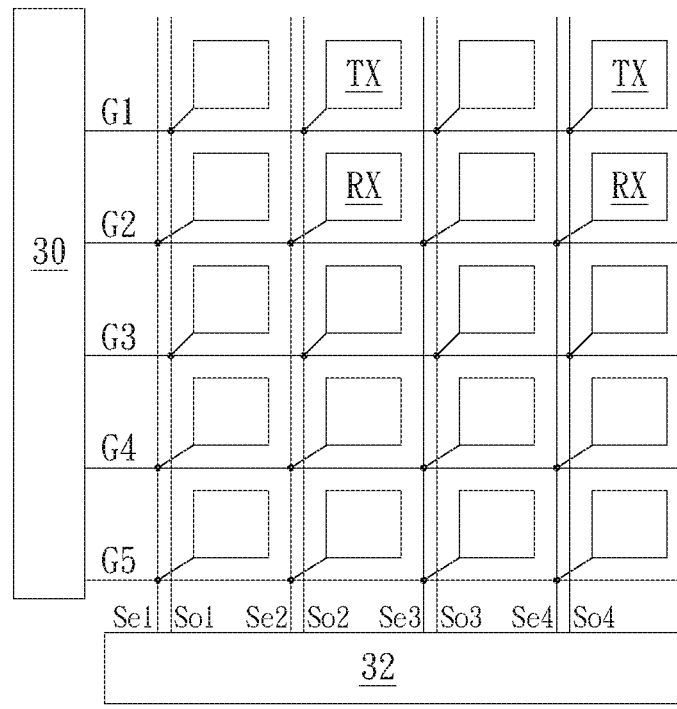

As shown in FIG. 17D, at this time, the sensing electrodes E12 and E14 of the first row of sensing electrodes E11~E14 are used as transmitter electrodes TX of mutual-capacitive sensing and the sensing electrodes E22 and E24 of the second row of sensing electrodes E21~E24 are used as receiver electrodes RX of mutual-capacitive sensing, wherein the sensing electrode E12 of the first row of sensing electrodes E11~E14 used as the transmitter electrode TX and the sensing electrode E22 of the second row of sensing electrodes E21~E24 used as the receiver electrode RX are adjacent to each other along the vertical direction; the sensing electrode E14 of the first row of sensing electrodes E11~E14 used as the transmitter electrode TX and the sensing electrode E24 of the second row of sensing electrodes E21~E24 used as the receiver electrodes RX are adjacent to each other along the vertical direction. As shown in FIG. 16, at this time, there are mutual-capacitive sensing signals on the sensing lines So2 and So4 coupled to the sensing electrodes E12 and E14 of the first row of sensing electrodes E11~E14 used as the transmitter electrodes TX and no mutual-capacitive sensing signals on the other sensing lines.

Figure 17E:
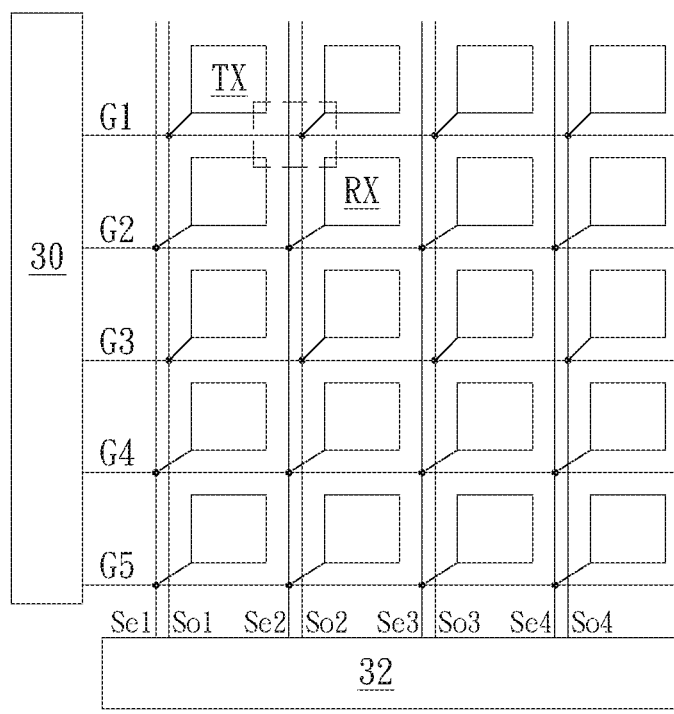

As shown in FIG. 17E, at this time, the sensing electrode E11 of the first row of sensing electrodes E11~E14 is used as transmitter electrode TX of mutual-capacitive sensing and the sensing electrode E22 of the second row of sensing electrodes E21~E24 is used as receiver electrode RX of mutual-capacitive sensing, wherein the sensing electrode E11 of the first row of sensing electrodes E11~E14 used as the transmitter electrode TX and the sensing electrode E22 of the second row of sensing electrodes E21~E24 used as the receiver electrode RX are adjacent to each other along an oblique angle of 45°. As shown in FIG. 16, at this time, there is a mutual-capacitive sensing signal on the sensing line So1 coupled to the sensing electrode E11 used as the transmitter electrode TX and no mutual-capacitive sensing signals on the other sensing lines.

Figure 17F:
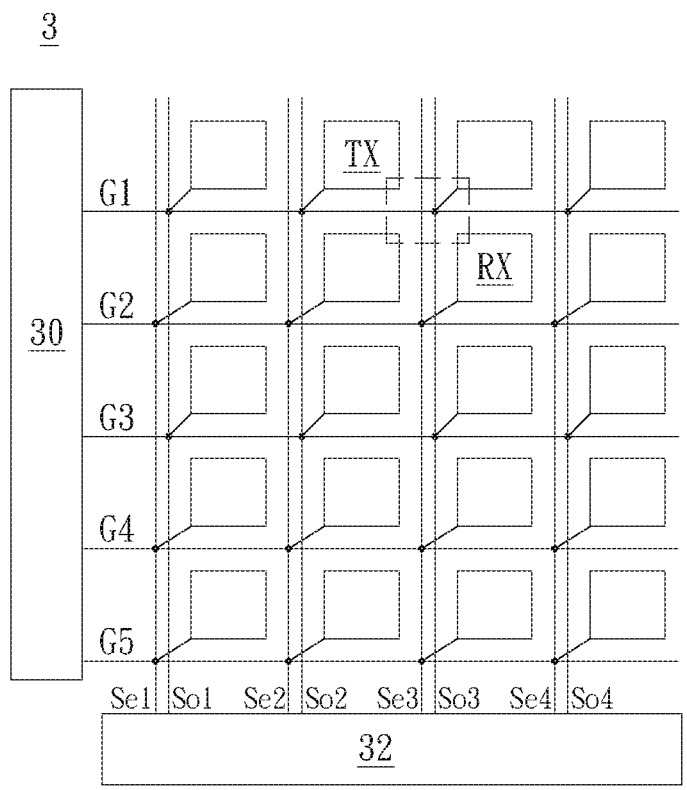

As shown in FIG. 17F, at this time, the sensing electrode E12 of the first row of sensing electrodes E11~E14 is used as transmitter electrode TX of mutual-capacitive sensing and the sensing electrode E23 of the second row of sensing electrodes E21~E24 is used as receiver electrode RX of mutual-capacitive sensing, wherein the sensing electrode E12 of the first row of sensing electrodes E11~E14 used as the transmitter electrode TX and the sensing electrode E23 of the second row of sensing electrodes E21~E24 used as the receiver electrode RX are adjacent to each other along an oblique angle of 45°. As shown in FIG. 16, at this time, there is a mutual-capacitive sensing signal on the sensing line So2 coupled to the sensing electrode E12 used as the transmitter electrode TX and no mutual-capacitive sensing signals on the other sensing lines.

Figure 17G:
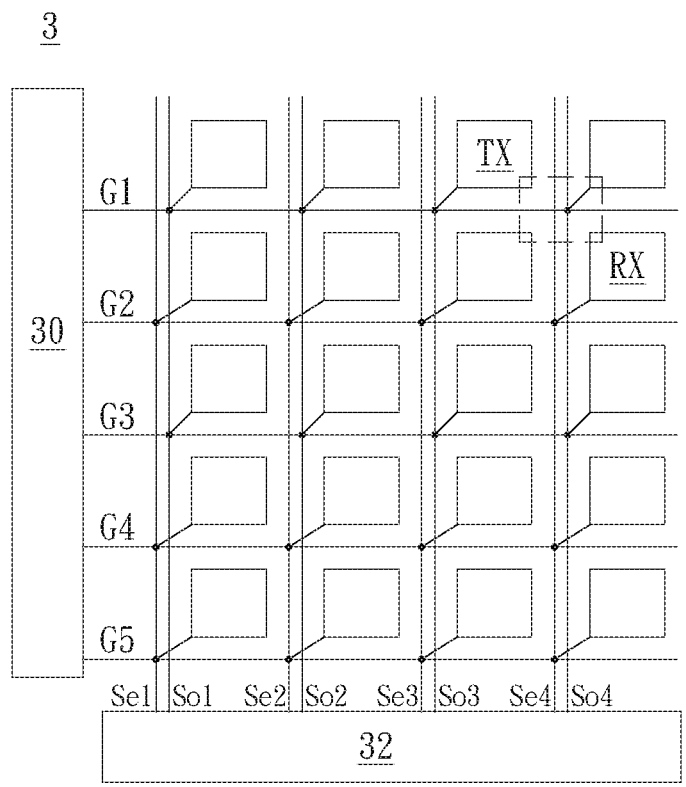

As shown in FIG. 17G, at this time, the sensing electrode E13 of the first row of sensing electrodes E11~E14 is used as transmitter electrode TX of mutual-capacitive sensing and the sensing electrode E24 of the second row of sensing electrodes E21~E24 is used as receiver electrode RX of mutual-capacitive sensing, wherein the sensing electrode E13 of the first row of sensing electrodes E11~E14 used as the transmitter electrode TX and the sensing electrode E24 of the second row of sensing electrodes E21~E24 used as the receiver electrode RX are adjacent to each other along an oblique angle of 45°. As shown in FIG. 16, at this time, there is a mutual-capacitive sensing signal on the sensing line So3 coupled to the sensing electrode E13 used as the transmitter electrode TX and no mutual-capacitive sensing signals on the other sensing lines.

Figure 17H:
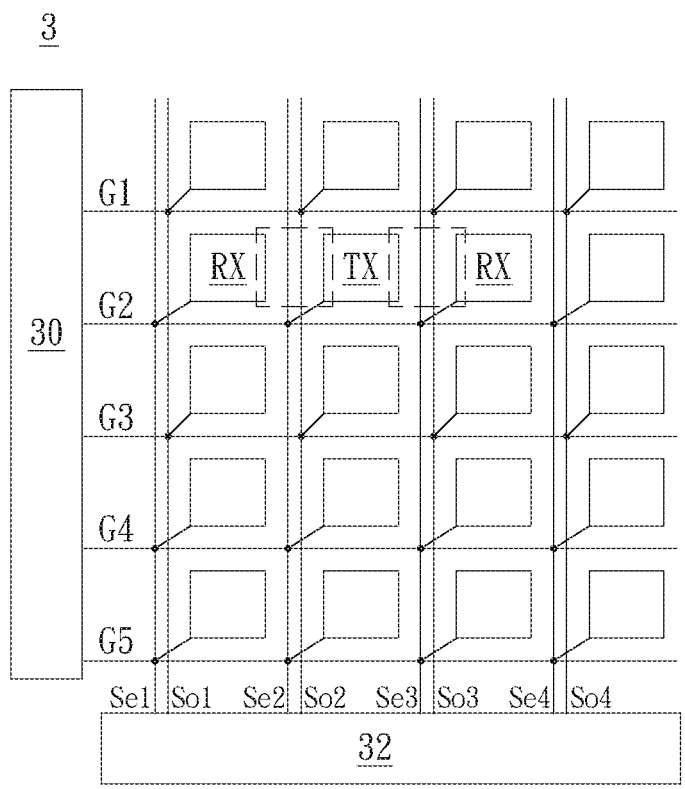

As shown in FIG. 17H, at this time, the sensing electrode E22 of the second row of sensing electrodes E21~E24 is used as transmitter electrode TX of mutual-capacitive sensing and the sensing electrodes E21 and E23 of the second row of sensing electrodes E21~E24 are used as receiver electrodes RX of mutual-capacitive sensing, wherein the sensing electrode E22 used as the transmitter electrode TX and the sensing electrodes E21 and E23 used as the receiver electrodes RX are adjacent to each other along the horizontal direction. As shown in FIG. 16, at this time, there is a mutual-capacitive sensing signal on the sensing line Se2 coupled to the sensing electrode E22 used as the transmitter electrode TX and no mutual-capacitive sensing signals on the other sensing lines.

Figure 17I:
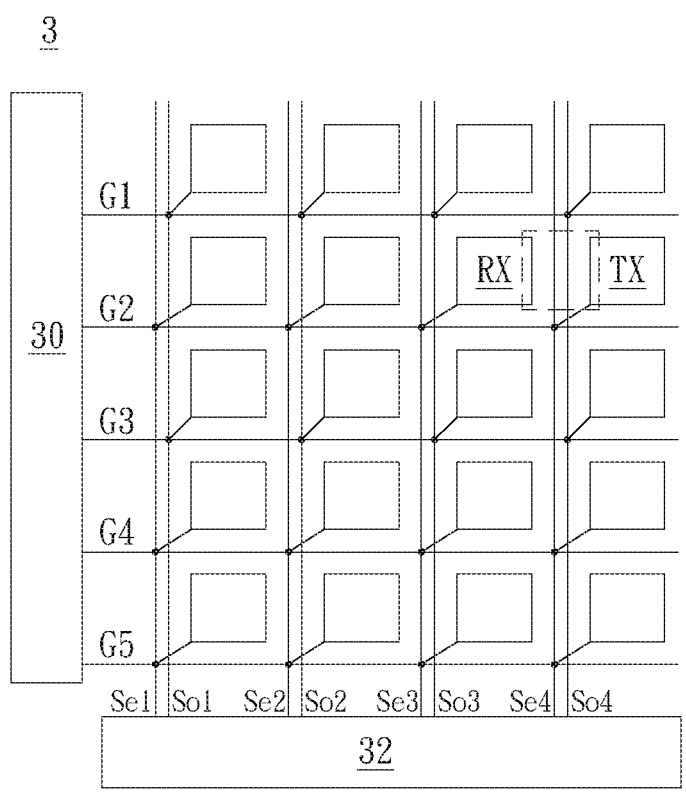

As shown in FIG. 17I, at this time, the sensing electrode E24 of the second row of sensing electrodes E21~E24 is used as transmitter electrode TX of mutual-capacitive sensing and the sensing electrode E23 of the second row of sensing electrodes E21~E24 is used as receiver electrode RX of mutual-capacitive sensing, wherein the sensing electrode E24 used as the transmitter electrode TX and the sensing electrode E23 used as the receiver electrode RX are adjacent to each other along the horizontal direction. As shown in FIG. 16, at this time, there is a mutual-capacitive sensing signal on the sensing line Se4 coupled to the sensing electrode E24 used as the transmitter electrode TX and no mutual-capacitive sensing signals on the other sensing lines.

Compared to the prior art, the capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a synthesized fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A capacitive fingerprint sensing apparatus, comprising:
    M sensing lines;
    N scanning lines;
    a plurality of sensing electrodes configured to form a (N*M) matrix having N rows of sensing electrodes and M columns of sensing electrodes, wherein the M columns of sensing electrodes are arranged along a first direction and coupled to the M sensing lines respectively and the N rows of sensing electrodes are arranged along a second direction and coupled to the N scanning lines respectively, M and N are positive integers;
    a scanning driver, coupled to the plurality of sensing electrodes through the N scanning lines respectively, configured to scan the N rows of sensing electrodes through the N scanning lines respectively in a self-capacitive sensing mode and in a mutual-capacitive sensing mode;
    a sensing driver coupled to the plurality of sensing electrodes through the M sensing lines respectively, configured to perform self-capacitive sensing on the M columns of sensing electrodes through the M sensing lines respectively in the self-capacitive sensing mode and to perform mutual-capacitive sensing between odd columns of sensing electrodes and even columns of sensing electrodes of the N rows of sensing electrodes through odd sensing lines and even sensing lines of the M sensing lines respectively in the mutual-capacitive sensing mode; and
    processing module, coupled to the plurality of sensing electrodes, configured to obtain a first fingerprint pattern in the self-capacitive sensing mode, to obtain a second fingerprint pattern in the mutual-capacitive sensing mode and then to combine the first fingerprint pattern and the second fingerprint pattern into a synthesized fingerprint pattern;
    wherein a resolution of the synthesized fingerprint pattern along at least one direction is larger than a resolution of the first fingerprint pattern and a resolution of the second fingerprint, pattern along the at least one direction, wherein the at least one direction comprises at least one of the first direction, the second direction, . . . , and a L-th direction, and L≥3.

2. The capacitive fingerprint sensing apparatus of claim 1, wherein a resolution of the first fingerprint pattern along the first direction is smaller than a resolution of the first fingerprint pattern along the second direction and a resolution of the second fingerprint pattern along the first direction is smaller than a resolution of the second fingerprint pattern along the second direction.

3. The capacitive fingerprint sensing apparatus of claim 1, wherein a resolution of the first fingerprint pattern along the second direction is smaller than a resolution of the first fingerprint pattern along the first direction and a resolution of the second fingerprint pattern along the second direction is smaller than a resolution of the second fingerprint pattern along the first direction.

4. The capacitive fingerprint sensing apparatus of claim 1, wherein a resolution of the first fingerprint pattern along the second direction is equal to a resolution of the first fingerprint pattern along the first direction and a resolution of the second fingerprint pattern along the second direction is equal to a resolution of the second fingerprint pattern along the first direction.

5. The capacitive fingerprint sensing apparatus of claim 1, wherein a resolution of the synthesized fingerprint pattern along the first direction and a resolution of the synthesized fingerprint pattern along the second direction are both equal to a resolution of the first fingerprint pattern along the second direction and a resolution of the second fingerprint pattern along the second direction.

6. The capacitive fingerprint sensing apparatus of claim 1, wherein a resolution of the synthesized fingerprint pattern along the first direction and a resolution of the synthesized fingerprint pattern along the second direction are different.

7. The capacitive fingerprint sensing apparatus of claim 1, wherein the sensing driver selects the odd sensing lines of the M sensing lines as signal transmitters (TX) and selects the even sensing lines of the M sensing lines as signal receivers (RX) or the sensing driver selects the odd sensing lines of the M sensing lines as the signal receivers (RX) and selects the even sensing lines of the M sensing lines as the signal transmitters (TX).

8. The capacitive fingerprint sensing apparatus of claim 1, wherein a J-th sensing line of the M sensing lines is coupled to every electrodes of a J-th column of sensing electrodes of the M columns of sensing electrodes respectively, J is a positive integer and 1≤J≤M, and a K-th scanning line of the N scanning lines is coupled to every electrodes of a K-th row of sensing electrodes of the N rows of sensing electrodes respectively, K is a positive integer and 1≤k≤N.

9. The capacitive fingerprint sensing apparatus of claim 1, wherein the plurality of sensing electrodes has random geometric shapes.

10. A capacitive fingerprint sensing apparatus, comprising:
    (M+1) sensing lines;
    N pairs of scanning lines, each pair of scanning lines comprising a first scanning line and a second scanning line;
    a plurality of sensing electrodes configured to form a (N*M) matrix having N rows of sensing electrodes and M columns of sensing electrodes, wherein the M columns of sensing electrodes are arranged along a first direction and coupled to the (M+1) sensing lines respectively in a Zig-Zag way and the N rows of sensing electrodes are arranged along a second direction and coupled to the N pairs of scanning lines respectively, M and N are positive integers; and a scanning driver, coupled to the plurality of sensing electrodes through the N pairs of scanning lines, configured to scan the N rows of sensing electrodes through the N pairs of scanning lines respectively in a self-capacitive sensing mode and to scan odd rows of sensing electrodes or even rows of sensing electrodes of the N rows of sensing electrodes through N first scanning lines and N second scanning lines of the N pairs of scanning lines respectively in a mutual-capacitive sensing mode;

a sensing driver, coupled to the plurality of sensing electrodes through the (M+1) sensing lines, configured to perform self-capacitive sensing on the M columns of sensing electrodes through the (M+1) sensing lines respectively in the self-capacitive sensing mode and to perform mutual-capacitive sensing on the M columns of sensing electrodes or the N rows of sensing electrodes through the (M+1) sensing lines respectively in the mutual-capacitive sensing mode;

a processing module, coupled to the plurality of sensing electrodes, configured to obtain a first fingerprint pattern, to obtain a second fingerprint pattern and then to combine the first fingerprint pattern and the second fingerprint pattern into a synthesized fingerprint pattern.

11. The capacitive fingerprint sensing apparatus of claim 10, wherein a resolution of the synthesized fingerprint pattern along at least one direction is larger than a resolution of the first fingerprint pattern and a resolution of the second fingerprint pattern along the at least one direction; the at least one direction comprises at least one of the first direction, the second direction, . . . and a L-th direction, and L≥3.

12. The capacitive fingerprint sensing apparatus of claim 10, wherein a resolution of the synthesized fingerprint pattern along the first direction and a resolution of the synthesized fingerprint pattern along the second direction are different.

13. The capacitive fingerprint sensing apparatus of claim 10, wherein a resolution of the synthesized fingerprint pattern along the first direction is equal to a resolution of the synthesized fingerprint pattern along the second direction.

14. The capacitive fingerprint sensing apparatus of claim 10, wherein the scanning driver selects odd sensing lines of the (M+1) sensing lines as signal transmitters (TX) and selects even sensing lines of the (M+1) sensing lines as signal receivers (RX) or the scanning driver selects the odd sensing lines of the (M+1) sensing lines as the signal receivers (RX) and selects the even sensing lines of the (M+1) sensing lines as the signal transmitters (TX).

15. The capacitive fingerprint sensing apparatus of claim 10, wherein a J-th sensing line and a (J+1)-th sensing line of the (M+1) sensing lines are coupled to any two adjacent sensing electrodes of a J-th column of sensing electrodes of the M columns of sensing electrodes respectively, J is a positive integer and 1≤J≤M, and a first scanning line and a second scanning line of a K-th pair of scanning lines of the N pairs of scanning lines are coupled to any two adjacent sensing electrodes in a K-th column of sensing electrodes of the M columns of sensing electrodes respectively, K is a positive integer and 1≤K≤N.

16. The capacitive fingerprint sensing apparatus of claim 10, wherein the plurality of sensing electrodes has random geometric shapes.

17. A capacitive fingerprint sensing method applied to a capacitive fingerprint sensing apparatus, the capacitive fingerprint sensing apparatus comprising a scanning driver, a sensing driver, a processing module, a plurality of sensing lines, a plurality of scanning lines and a plurality of sensing electrodes, the plurality of sensing electrodes being configured to be arranged in a regular way, the scanning driver being coupled to the plurality of sensing electrodes through the plurality of scanning lines respectively, the sensing driver being coupled to the plurality of sensing electrodes through the plurality of sensing lines respectively, the processing module being coupled to the plurality of sensing electrodes, the capacitive fingerprint sensing method comprising:

in a self-capacitive sensing mode, the scanning driver configured to scan the plurality of sensing electrodes through the plurality of scanning lines respectively and the sensing driver configured to perform self-capacitive sensing on the plurality of sensing electrodes through the plurality of sensing lines respectively;

in a mutual-capacitive sensing mode, the scanning driver configured to scan the plurality of sensing electrodes through the plurality of scanning lines respectively and the sensing driver configured to perform mutual-capacitive sensing on at least one pair of adjacent sensing electrodes of the plurality of sensing electrodes through the plurality of sensing lines respectively; and the processing module configured to obtain a first fingerprint pattern in the self-capacitive sensing mode, to obtain a second fingerprint pattern in the mutual-capacitive sensing mode and then to combine the first fingerprint pattern and the second fingerprint pattern into a synthesized fingerprint pattern, wherein a resolution of the synthesized fingerprint pattern along at least one direction is larger than a resolution of the first fingerprint pattern and a resolution of the second fingerprint pattern along the at least one direction.

18. The capacitive fingerprint sensing method of claim 17, wherein the at least one direction comprises at least one of the first direction, the second direction, . . . , and a L-th direction, and L≥3.

19. The capacitive fingerprint sensing method of claim 18, wherein a resolution of the first fingerprint pattern along the first direction is smaller than a resolution of the first fingerprint pattern along the second direction and a resolution of the second fingerprint pattern along the first direction is smaller than a resolution of the second fingerprint pattern along the second direction.

20. The capacitive fingerprint sensing method of claim 18, wherein a resolution of the first fingerprint pattern along the second direction is smaller than a resolution of the first fingerprint pattern along the first direction and a resolution of the second fingerprint pattern along the second direction is smaller than a resolution of t e second fingerprint pattern along the first direction.

21. The capacitive fingerprint sensing method of claim 18, wherein a resolution of the synthesized fingerprint pattern along the first direction and a resolution of the synthesized fingerprint pattern along the second direction are both equal to a resolution of the first fingerprint pattern along the second direction and a resolution of the second fingerprint pattern along the second direction.

22. The capacitive fingerprint sensing method of claim 18, wherein a resolution of the synthesized fingerprint pattern along the first direction and a resolution of the synthesized fingerprint pattern along the second direction are different.

23. The capacitive fingerprint sensing method of claim 18, wherein the regular way that the plurality of sensing electrodes is arranged is a matrix arrangement or a triangle arrangement.

24. The capacitive fingerprint sensing method of claim 18, wherein the at least one pair of adjacent sensing electrodes are sensing electrodes adjacent to each other along the first direction, the second direction, . . . or the L-th direction.

* * * * *